United States Patent [19]

Yoshida

[11] Patent Number: 6,091,807
[45] Date of Patent: Jul. 18, 2000

[54] FACSIMILE APPARATUS COMMUNICATING BASED ON ITU-T RECOMMENDATIONS V. 8 AND V. 34

[75] Inventor: Takehiro Yoshida, Tokyo, Japan

[73] Assignee: Canon Kabushiki Kaisha, Tokyo, Japan

[21] Appl. No.: 08/840,886

[22] Filed: Apr. 17, 1997

[30] Foreign Application Priority Data

Apr. 19, 1996 [JP] Japan .................................. 8-122525

[51] Int. Cl.⁷ .............................................. H04M 11/00
[52] U.S. Cl. ................ 379/100.01; 358/400; 379/100.06
[58] Field of Search ........................ 379/100.01, 100.12, 379/100.05, 100.06, 100.09, 100.17; 358/400, 437, 438, 439, 440, 441, 434

[56] References Cited

U.S. PATENT DOCUMENTS

| | | | |
|---|---|---|---|
| 4,931,250 | 6/1990 | Greszczuk | 375/222 |
| 5,025,469 | 6/1991 | Bingham | 379/100.17 |
| 5,142,568 | 8/1992 | Ogata et al. | 379/100.13 |
| 5,307,179 | 4/1994 | Yoshida | 358/440 |
| 5,335,085 | 8/1994 | Nakatsuma | 358/404 |
| 5,692,040 | 11/1997 | Greenblatt | 379/350 |
| 5,715,238 | 2/1998 | Hall, Jr. et al. | 370/242 |
| 5,732,104 | 3/1998 | Brown et al. | 375/222 |
| 5,751,441 | 5/1998 | Morimoto | 358/435 |
| 5,793,843 | 8/1998 | Morris | 379/420 |
| 5,825,500 | 10/1998 | Heo et al. | 358/437 |
| 5,896,204 | 5/1999 | Sato et al. | 358/405 |

OTHER PUBLICATIONS

Data Communication Over The Telephone Network, Procedures For Starting Sessions Of Data Transmission Over The General Switched Telephone Network, ITU–T Recommendation V.8, Sep. 1994.

Signalling Rates Of Up To 28800 bit/s For Use On The General Switched Telephone Network And On Leased Point–To Point 2–Wire Telephone–TypeCircuits, ITU–T Recommendation V.34, Sep. 1994.

*Primary Examiner*—Curtis A. Kuntz
*Assistant Examiner*—Melur Ramakrishnaiah
*Attorney, Agent, or Firm*—Fitzpatrick, Cella, Harper & Scinto

[57] ABSTRACT

A facsimile apparatus performs an effective process in retransmission when a communication based on ITU-T Recommendations V. 8 and V. 34 ends with an error. A retransmission in succession to an error that occurs in the middle of a V. 8 and V. 34 communication is performed in one of the following transmission modes: a mode not performing the V.8 and V. 34 communication, a mode performing V. 8 and V. 34 communication but with a baud rate limited, and a mode performing the V. 8 and V. 34 communication but with a bit rate limited.

10 Claims, 33 Drawing Sheets

FACSIMILE APPARATUS COMMUNICATING BASED ON ITU-T RECOMMENDATIONS V. 8 AND V. 34

BACKGROUND OF THE INVENTION

1. Field of the Invention

The present invention relates to a facsimile apparatus that communicates based on Recommendations V. 8 and V. 34 formulated by the ITU-T (Telecommunication Standardization Sector of International Telecommunication Union).

2. Related Background Art

The V. 8 and V. 34 procedures were recommended by the ITU in September 1994. See, Data Communication Over The Telephone Network, Procedures For Starting Sessions Of Data Transmission Over The General Switched Telephone Network, ITU-T Recommendation V.8, and Data Communication Over The Telephone Network, A Modem Operating At Data Signalling Rates Of Up To 28800 bit/s For Use On The General Switched Telephone Network And On Leased Point-To Point 2-Wire Telephone-Type Circuits, ITU-T Recommendation V.34, both of which are incorporated herein by reference.

In these V. 8 and V. 34 procedures, communications are full-duplex. Image transmission according to the V. 34 procedure requires a higher S/N ratio and a wider band width than conventional facsimile apparatuses that meet with the V. 17 Recommendation.

For this reason, communication errors are expected to occur more frequently in the V. 8 procedure, V. 34 procedure and V. 34 image transmission than in the V. 21 procedure, and V. 27 ter., V. 29 and V. 17 image transmissions.

When a communication error takes place during V. 8 and V. 34 communication, a transmitter side performs redialing, and a receiver side attempts to communicate through V. 8 and V. 34 procedures. In this case, a communication error is likely to occur again unless the line characteristics involved are changed. Before completing the communication, a line is continuously occupied for a long period of time and the cost for communication is pushed up.

If a retransmission is made subsequent to a communication error using the conventional method, the communication time is prolonged without fully exploiting the high-speed characteristic of V. 34 image transmission.

SUMMARY OF THE INVENTION

Accordingly, it is an object of the present invention to provide an improved facsimile apparatus.

It is another object of the present invention to provide a facsimile apparatus that performs an effective process in retransmission in the event of an error through V. 8 and V. 34 communications.

These and other objects of the present invention will be more apparent when the following detailed description of the invention is considered with the drawings.

DESCRIPTION OF THE PREFERRED EMBODIMENTS

Figure 1:
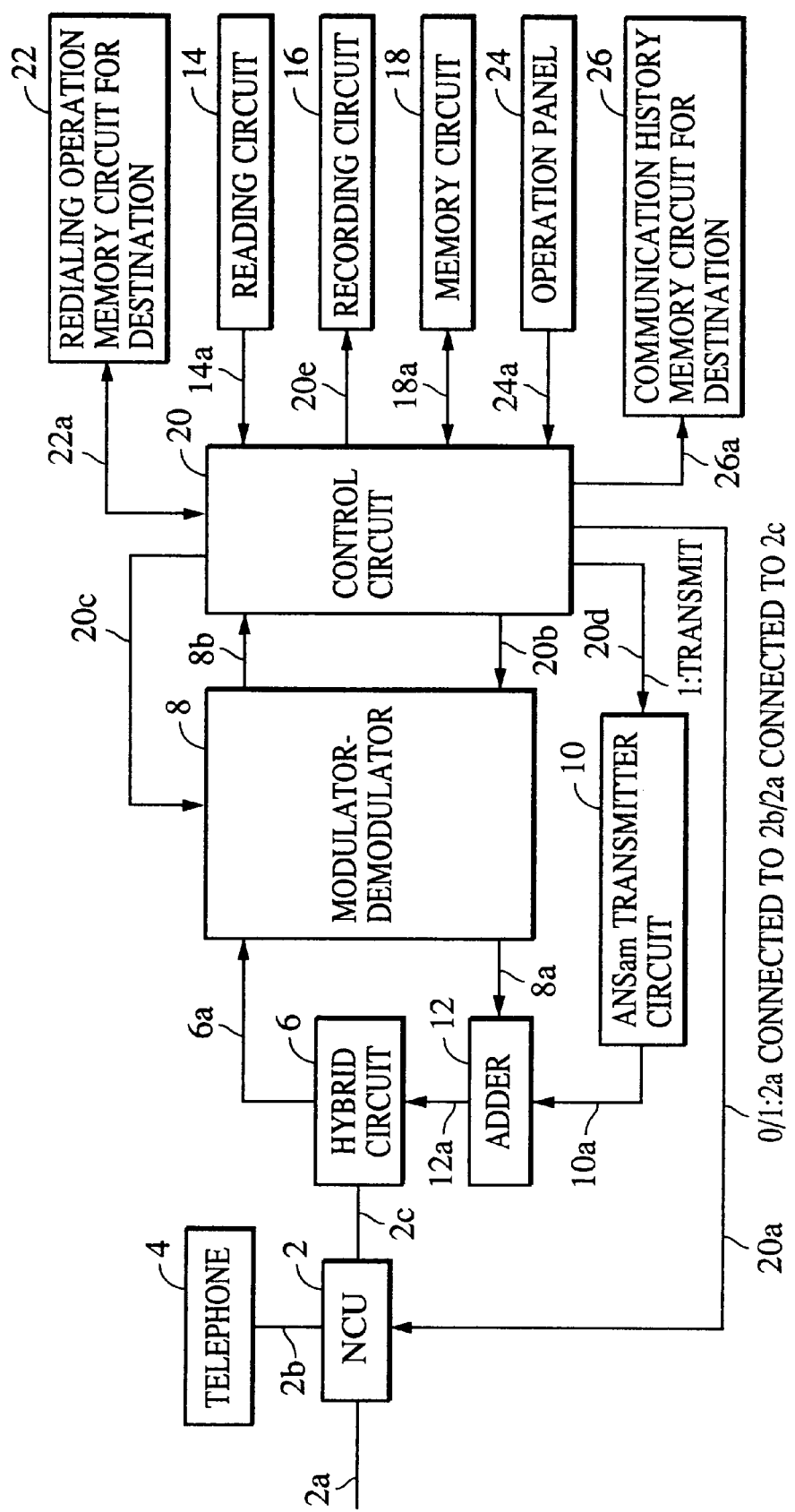
FIG. 1 is a block diagram of first and second embodiments of the present invention.

Referring to the drawings, the embodiments of the present invention are now discussed.

FIG. 1 is a block diagram showing a facsimile apparatus in which first and second embodiments of the present invention are incorporated. The facsimile apparatus complies with ITU-T Recommendations V. 8 and V. 34.

A network control unit (NCU) 2 connected to the line of a telephone grid controls connection with the telephone grid, switches to a data communication line, and retains a loop to use the telephone grid for data communications. NCU2 connects a telephone line 2a to a telephone 4 when a control circuit 20 gives a 0-level signal (on a signal line 20a), and connects the telephone line 2a to the facsimile apparatus when a 1-level signal is given. In normal operation status, the telephone line 2a remains connected to the telephone 4.

A hybrid circuit 6 isolates transmitted signals from received signals, supplies transmitted signals from an adder 12 to the telephone line 2a via NCU2, receives signals from other linked stations via NCU2 and sends the received signals to a modulator-demodulator 8 via signal line 6a.

The modulator-demodulator 8 performs modulation and demodulation based on ITU-T Recommendations V. 8, V. 21, V. 27 ter, V. 29, V. 17, and V. 34, and is instructed to perform the respective transmission modes via a signal line 20c. The modulator-demodulator 8 outputs modulated data over a signal line 8a while receiving a signal output over a signal line 20b, and outputs demodulated data over a signal line 8b while receiving a signal output over a signal line 6a.

An ANSam circuit 10 outputs an ANSam signal. The ANSam circuit 10 outputs the ANSam signal to a signal line 10a when a 1-level signal is output over a signal line 20d, and outputs no signal over the signal line 10a when a 0-level signal is output over the signal line 20d.

An adder 12 receives information from signal lines 8a and 10a, and outputs an added result over a signal line 12a. A reading circuit 14 reads an image of an original document, and outputs read image data over a signal line 14a. A recording circuit 16 records information output over a line 20e, sequentially one line by one line.

A memory circuit 18 stores unprocessed read information, coded information, received information and decoded information.

A memory circuit 22 stores a redialing operation in compliance with each destination station via a signal line 22a. To cope with a communication error taking place in V. 8 and V. 34 communications, the memory circuit 22 stores transmission modes in subsequent redialing operations for retransmission: a mode not using V.8 and V. 34 procedures, a mode performing V. 8 and V. 34 procedures but at a lower baud rate, and a mode performing V. 8 and V. 34 procedures but at a lower bit rate. The apparatus is controlled to follow one of the stored transmission modes when a redialing operation for retransmission is performed. In the event of a communication error in V. 8 and V. 34 procedures, the apparatus can comply with each destination in broadcast or the other operations.

An operation panel 24 comprises a one touch dial key, an abbreviated dial key, numerical keys, an asterisk (*) key, a sharp (#) key, a start key, and other function keys. Information corresponding to any pressed key is output over a signal line 24a.

A memory circuit 26 stores, via a signal line 26a, the history of past communications for each destination carried out based on V. 8 and V. 34 procedures.

The control circuit 20 generally controls the facsimile apparatus. Particularly, in a first embodiment of the present invention, the control circuit 20 controls the apparatus so that the transmission mode is changed in consideration of the content of an error when retransmission is performed subsequent to a V. 8 and V. 34 communication that ended in error.

Specifically, transmission modes in retransmission following an error, available on a destination by destination basis, are a mode not using V.8 and V. 34 procedures, a mode performing V. 8 and V. 34 procedures but at a lower baud rate, and a mode performing V. 8 and V. 34 procedures but at a lower bit rate.

When an error takes place in the V. 8 and V. 34 communication, for example, with the V. 8 communicateion ended with a error, the transmission mode not based on V. 8 and V. 34 is used for retransmission subsequent to the error. When an error takes place in the middle of image transmission during the V. 34 procedure, the V. 8 and V. 34 communication is performed for retransmission but with its baud rate limited. When a communication error takes place after PPR was detected 5 times or more in a single communication, the V. 8 and V. 34 communication is performed but with its bit rate limited. For errors other than these, retransmission is performed with no limitation imposed.

Figure 2:
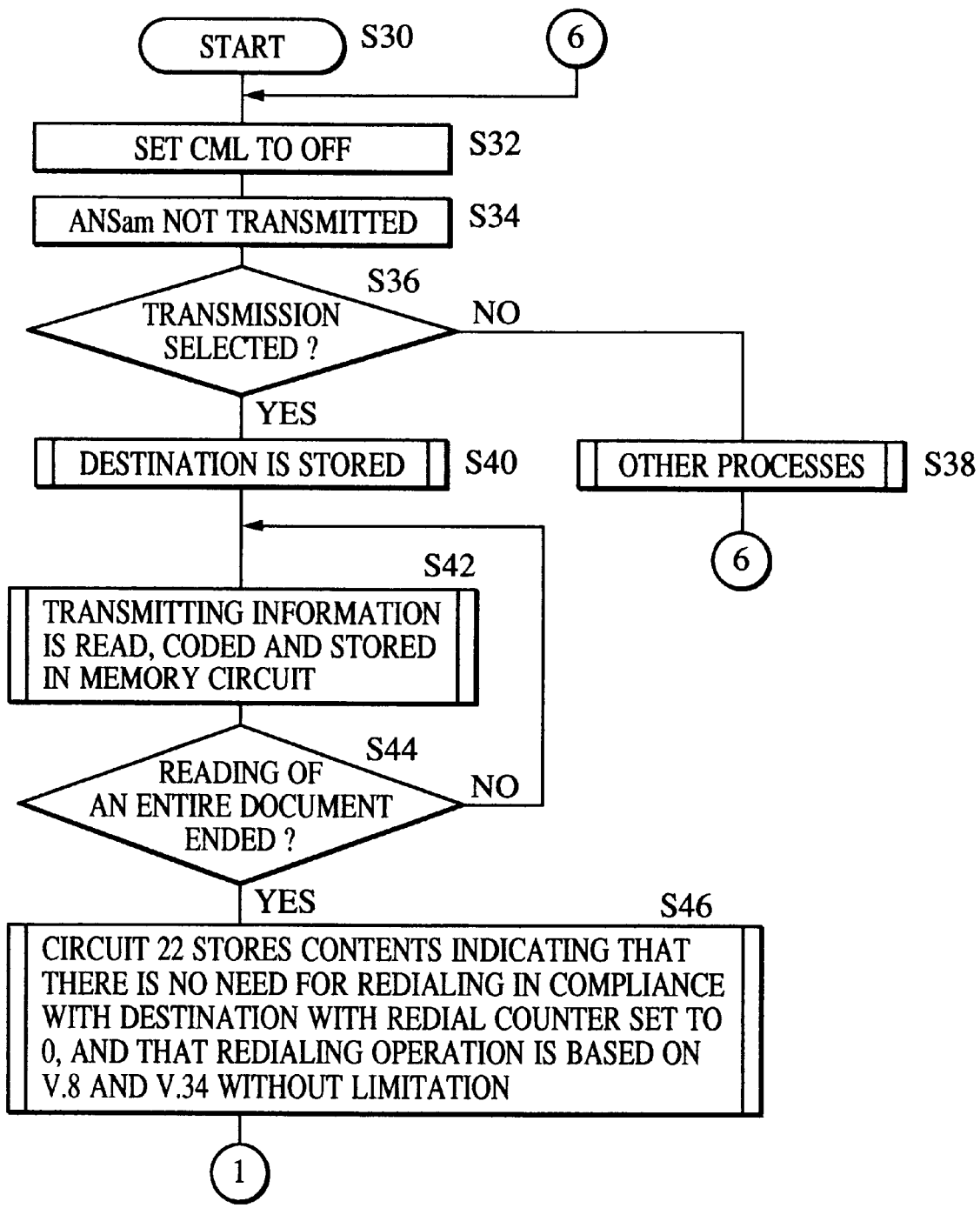
FIG. 2 is a flow diagram of the operation of the first embodiment.
Figure 3:
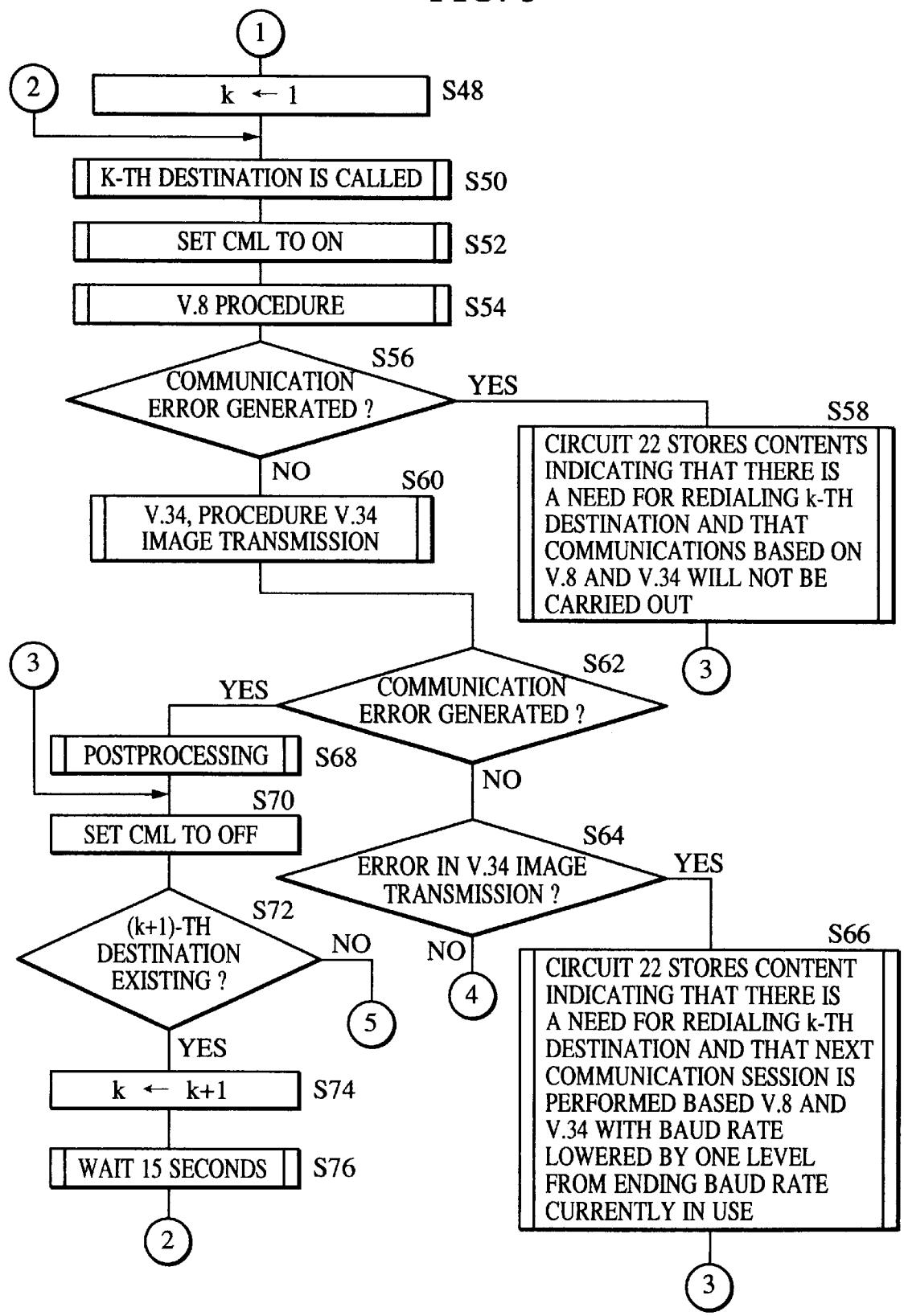
FIG. 3 is a flow diagram of the operation of the first embodiment.
Figure 4:
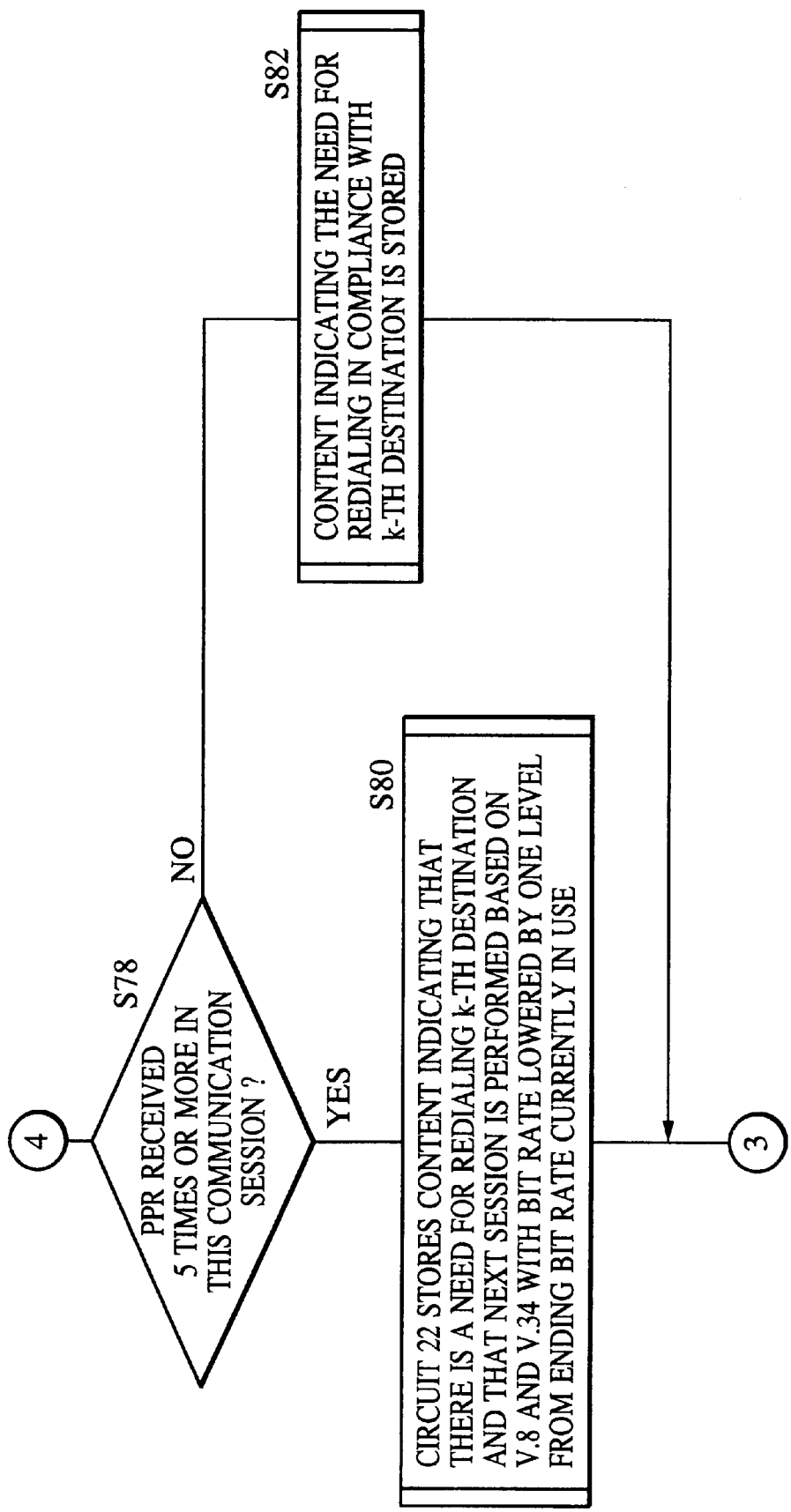
FIG. 4 is a flow diagram of the operation of the first embodiment.
Figure 5:
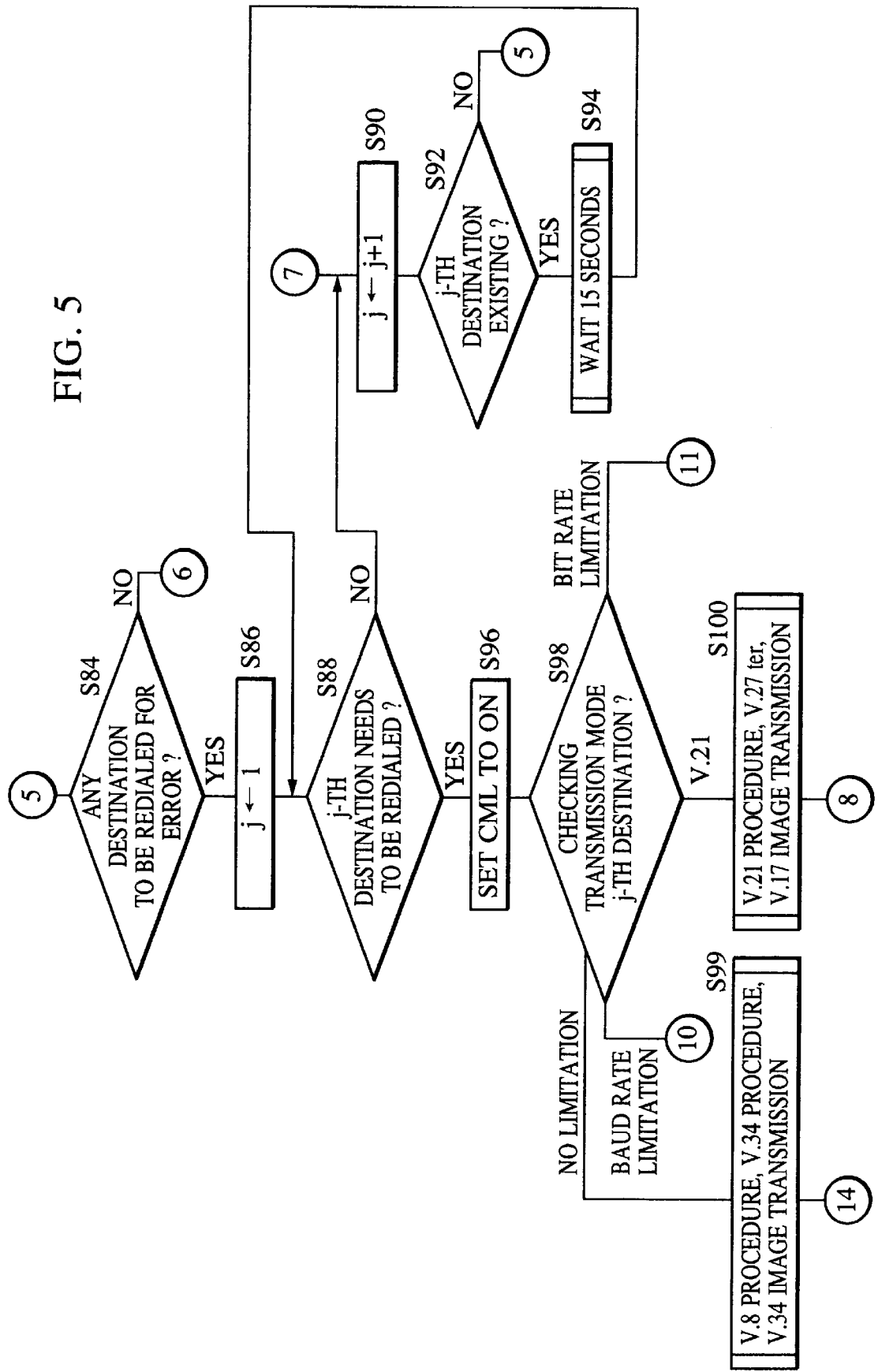
FIG. 5 is a flow diagram of the operation of the first embodiment.

FIGS. 2 through 4 are flow diagrams showing the flow of control sequence in the operation of the control circuit 20 according to the first embodiment.

The operation starts at step S30. At step S32, a 0-level signal is output over the signal line 20a to set a CML to off. At step S34, a 0-level signal is output over the signal line 20d not to transmit an ANSam signal.

At step S36, the control circuit 20 receives information from the signal line 24a to determine whether a transmission is selected. When a transmission is not selected, the sequence goes to step S38 to perform other processes.

When a transmission is selected, the sequence goes to step S40, where a plurality of destinations are stored for a broadcast communication. For a memory transmission, a single destination is stored.

A document to be transmitted is read, coded and stored at step S42. At step S44, a determination is made of whether the reading of an entire document is completed. When the reading of the entire document is completed, the sequence goes to step S46. When the document reading is still incomplete, the sequence returns to step S42.

At step S46, the control circuit 20 deems the need for redialing in compliance with the destination as unnecessary, sets a redial counter to 0, and then stores, in the memory circuit 22, a redialing operation for V. 8 and V. 34 communication without limitation.

A counter k is set to 1 at step S48, and a call is made to a k-th destination at a step S50. At step S52, a 1-level signal is output over the signal line 20a to set the CML to on.

At step S54, the V. 8 procedure is performed. At step S56, a determination is made of whether a communication error has occurred in the V. 8 procedure. When an error has occurred, the sequence goes to step S58, where the memory circuit 22 stores contents indicating that there is a need for redialing the k-th destination and that the V. 8 and V. 34 communication will not be performed. Then, the sequence goes to step S70.

With no error occurring, the sequence goes to step S60, where the V. 34 procedure and V. 34 image transmission are followed. At step S62, a determination is made of whether a communication error occurred in the V. 34 procedure and V. 34 image transmission. When an error occurred, the sequence goes to step S64. When no error occurred, the sequence goes to step S68.

At step S64, a determination is made of whether the communication error occurred in the V. 34 image transmission. When an error occurred, the sequence goes to step S66. When no error occurred, the sequence goes to step S78.

At step S66, the memory circuit 22 stores contents indicating that there is a need for redialing the k-th destination, and that a next V. 8 and V. 34 communication will be performed at a baud rate that is one level lower than the ending baud rate of the current communication.

At step S68, a postprocessing is carried out. At step S70, a 0-level signal is output over the signal line 20a to set the CML to off.

At step S72, a determination is made of whether there exists a (k+1)-th destination. When there is no such destination, the sequence goes to step S84. When there exists the (k+1)-th destination, the sequence goes to step S74, where the count of the counter k is incremented by 1. The sequence waits 15 seconds at step S76, and then returns to step S50.

At step S78, a determination is made of whether the PPR signal was received 5 times or more in this one communication. When it was received 5 times or more, the sequence goes to step S80, where the memory circuit 22 stores contents indicating that there is a need for redialing in compliance with the k-th destination and that a next V. 8 and V. 34 communication will be performed at a bit rate that is one level lower than the ending bit rate of the current communication. When the PPR signal was received less than 5 times, the sequence goes to step S82, where the content indicating that there is a need for redialing in compliance with the k-th destination is stored. Then, the sequence goes to step S70.

At step S84, a determination is made of whether there exists a destination to be redialed for error. When there is no such destination, the sequence goes to step S32. When there is a destination, the sequence goes to step S86, where a counter j is set to 1.

AT step S88, a determination is made of whether the j-th destination needs to be redialed. When the j-th destination needs redialing, the sequence goes to step S96.

When the j-th destination needs no redialing, the sequence goes to step S90, where the count of the counter k is incremented by 1. At step S92, a determination is made of whether there exists a j-th destination. When there is no destination, the sequence goes to step S84. When there is a j-th destination, the sequence goes to step S94, where a wait of 15 seconds is provided.

At step S96, a 1-level signal is output over the signal line 20a, setting the CML to on. At step S98, the transmission mode of the k-th destination is determined by receiving the information from the memory circuit 22. When there is no limitation, the sequence goes to step S99, where the V. 8 procedure, V. 34 procedure and V. 34 image transmission are followed. Then, the sequence goes to step S118.

When step S98 indicates that the V. 8 and V. 34 communication is not carried out, the sequence goes to step S100. The sequence goes to step S116, when step S98 indicates that the V. 8 and V. 34 communication is performed starting at a baud rate that is one level lower than the baud rate at the time of the error. The sequence goes to step S120, when step S98 indicates that the V. 8 and V. 34 communication is performed starting at a bit rate that is one level lower than the bit rate at the time of the error.

At step S100, V. 21 procedure, and V. 27 ter, V. 29 and V. 17 image transmission are followed. At step S102, a determination is made of whether a communication error occurred in the communication at step S100. When the error is detected, the sequence goes to step S108, where the count stored for the J-th destination is incremented by 1 and then stored in the redial counter in the memory circuit 22. The sequence then goes to step S110.

When no error is detected in step S102, the sequence goes to step S104, where the memory circuit 22 stores a content indicating that there is no need for redialing the J-th destination. At step S106, a 0-level signal is output over the signal line 20a, setting the CML to off. The sequence then goes to step S90.

At step S110, a 0-level signal is output over the signal line 20a, setting the CML to off. At step S112, a determination is made of whether the count stored in the redial counter at step S108 is 3 or more. When the count is 3 or more, the sequence goes to step S114, where the communication with this destination is deemed as an erratic one, which is written in a broadcast transmission result report when broadcasting and written in a communication report when in a memory transmission. When the count is less than 3, the sequence goes to step S90.

The V. 8 procedure and V. 34 image transmission are performed at step S116. In this case, based on the information in the memory circuit 22, a communication starts at a baud rate that is one level lower than the baud rate immediately prior to the erratic communication.

At step S118, a determination is made of whether a communication error occurred at step S116. When a communication error is detected, the sequence returns to step S108. When no communication error is detected, the sequence returns to step S104.

The V. 8 procedure, V. 34 procedure and V. 34 image transmission are followed at step S120. In this case, based on the information in the memory circuit 22, a communication starts at a bit rate that is one level lower than the bit rate immediately prior to the erratic communication.

At step S122, a determination is made of whether a communication error occurred at step S120. When a communication error is detected, the sequence returns to step S108. When no communication error is detected, the sequence returns to step S104.

As described above, the optimum transmission mode in consideration of the error content is selected to perform a highly reliable communication.

A second embodiment of the present invention is now discussed.

In the second embodiment, communication results according to V. 8 and V. 34 procedures are stored in connection with each destination, and the stored information may be used next time to determine a transmission mode when a communication is made to the same destination. The transmission mode determined utilizes the V. 8 and V. 34 communication but at a limited bit rate.

Figure 9:
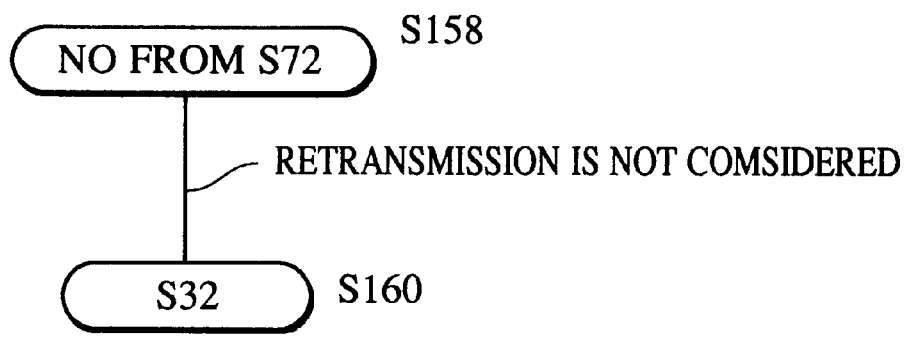
FIG. 9 is a flow diagram of the operation of the second embodiment.
Figure 8:
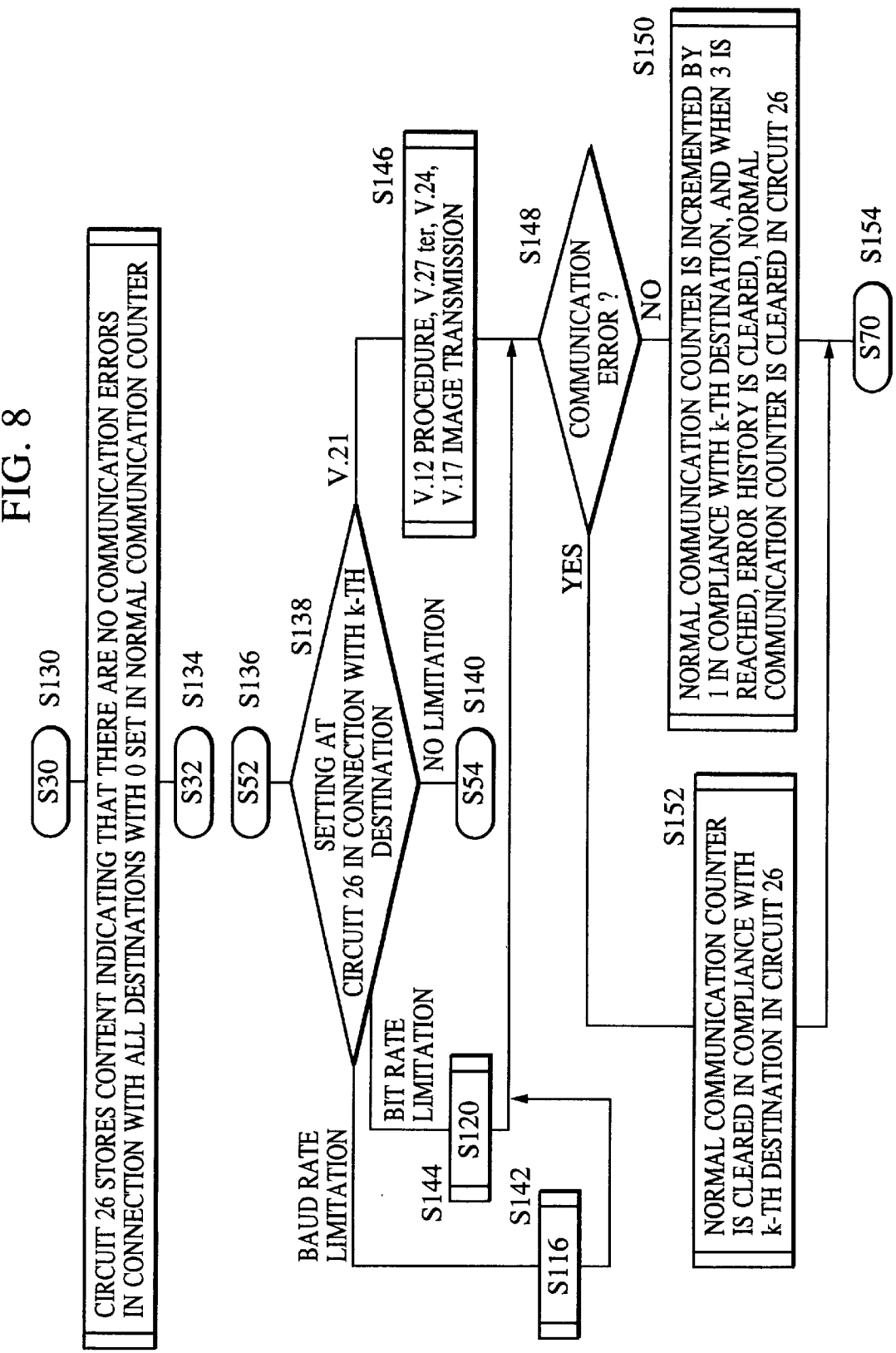
FIG. 8 is a flow diagram of the operation of the second embodiment.

FIGS. 8 and 9 are flow diagrams showing the flow of control of the second embodiment that is different from that of the first embodiment (shown in FIGS. 2 through 7). For simplicity, the retransmission in succession to a communication error is not considered in this embodiment.

Step S130 in FIG. 8 corresponds to step S30 in FIG. 2. Since all destinations at this point have no past communication errors, the V. 8 and V. 34 communication is performed via the signal line 26a at step S132. A normal communication counter in the memory circuit 26 is set to 0. At step S134, the sequence goes to the already-described step S32.

Step S136 corresponds to step S52. At step S138, information over the signal line 26a is received, and the setting for the k-th destination in the memory circuit 26 is checked for error. When the k-th destination has no past communication errors, namely, when no limitation is imposed in the V. 8 and V. 34 communication, the sequence goes to step S140 (S54).

When step S138 reveals that the V. 8 and V. 34 communication is performed but with a baud rate limitation, the same control as in the step S116 is performed at step S142; namely, based on the information in the memory circuit 22, a V. 8 procedure and V. 34 image transmission start at a baud rate that is one level lower than the baud rate immediately prior to the erratic communication.

When step S138 reveals that the V. 8 and V. 34 communication is performed with a bit rate limitation, the same control as in the step S120 is performed at step S144; namely, based on the information in the memory circuit 22, the V. 8 procedure, V. 34 procedure and V. 34 image transmission start at a bit rate that is one level lower than the bit rate immediately prior to the erratic communication.

When step S138 reveals that the V. 8 and V. 34 communication is not selected, the sequence goes to step S146, where V. 21 procedure, V. 27 ter, V. 29 and V. 17 image transmission are performed.

At step S148, a determination is made of whether an error has occurred. When an error has occurred, the sequence goes to step S152, where the normal communication counter is cleared via the signal line 26a in response to the k-th destination, and then these settings are stored in the memory circuit 26. At step S154, the sequence goes to the above-described step S70.

When no error has occurred, the sequence goes to step S150. The normal communication counter in the memory circuit 26 is incremented by 1 via the signal line 26a in response to the k-th destination. When the count in the counter reaches 3, past communication errors, namely the error history is cleared. Next time, the V. 8 and V. 34 communication is performed without any particular limitation. The normal communication counter is cleared and these settings are stored in the memory circuit 26. At step S154, the sequence goes to the above-described step S70.

In the control in each of steps S58, S60 and S80, storing is performed in the memory circuit 26 rather than in the memory circuit 22, and in each control, the normal communication counter is cleared. Redialing is not needed, and thus the content that there is a need for redialing is not stored.

As described above, since the second embodiment considers no retransmission arising from a communication error, step S158 ("no" from step S72) is followed by step S160 (S32).

As described above, according to the second embodiment, the apparatus selects a proper transmission mode in compliance with the communication history of each destination in a V. 8 and V. 34 communication, thereby performing a highly reliable communication.

A third embodiment of the present invention is now discussed.

Figure 10:
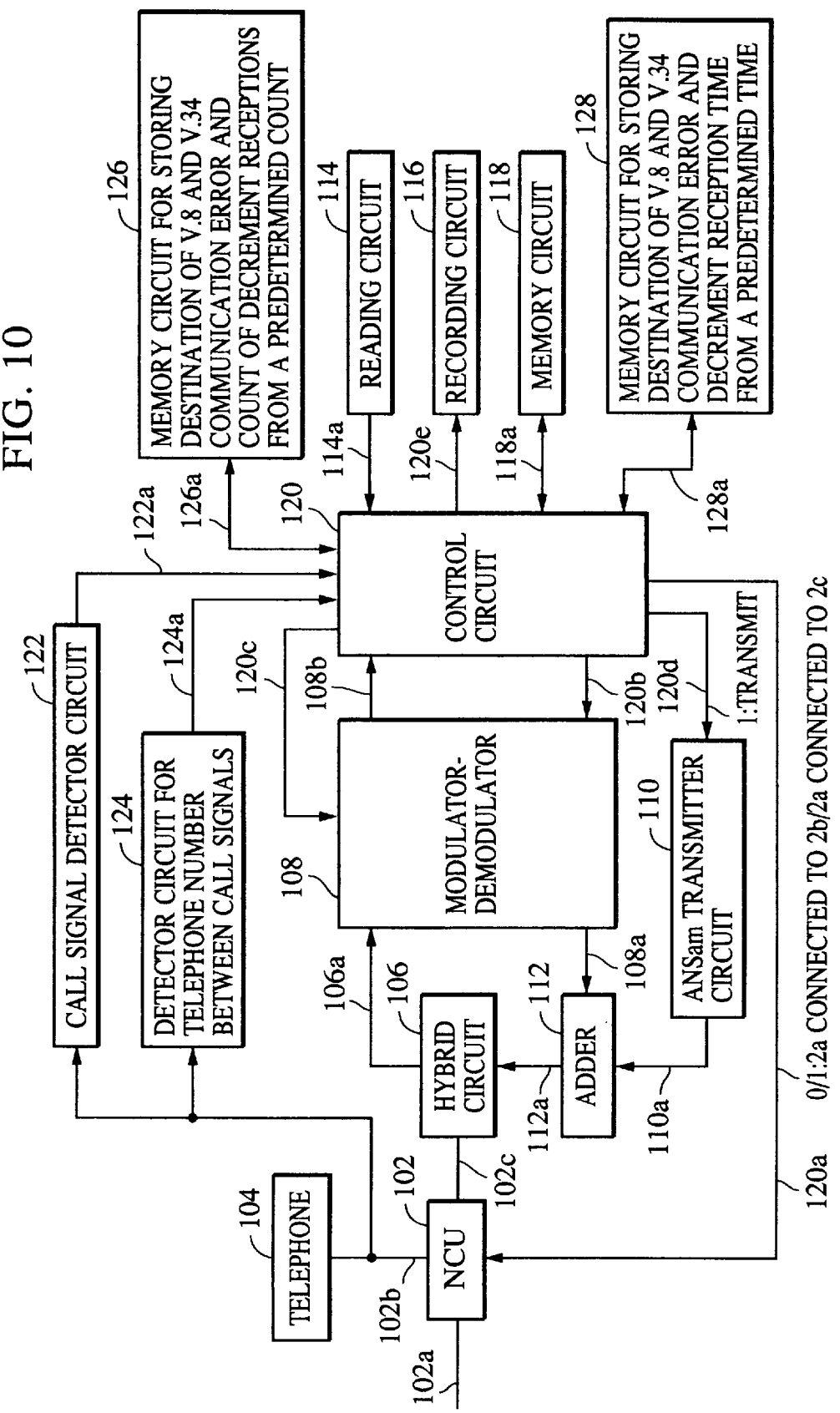
FIG. 10 is a block diagram of third and fourth embodiments of the present invention.

FIG. 10 is a block diagram showing a facsimile apparatus in which third and fourth embodiments of the present invention are incorporated. This facsimile apparatus has a function of detecting telephone number information of a calling station prior to a call connection.

NCU102 connected to the line of a telephone grid controls connection with the telephone grid, switches to data communications line, and retains a loop to use the telephone grid for data communications. NCU102 connects a telephone line 102a to a telephone 104 when a control circuit 120 gives a 0-level signal (on a signal line 120a), and connects the telephone line 102a to the facsimile apparatus when a 1-level signal is given. In normal operation status, the telephone line 102a remains connected to the telephone 104.

A hybrid circuit 106 isolates transmitted signals from received signals, supplies transmitted signals from an adder 112 to the telephone line 102a via NCU102, receives signals from other linked stations via NCU102 and sends the received signal to a modulator-demodulator 108 via signal line 106a.

The modulator-demodulator 108 performs modulation and demodulation based on ITU-T Recommendations V. 8, V. 21, V. 27 ter, V. 29, V. 17, and V. 34, and is instructed to perform the respective transmission modes via a signal line 120c. The modulator-demodulator 108 outputs modulated data over a signal line 108a while receiving a signal output over a signal line 120b, and outputs demodulated data over a signal line 108b while receiving a signal output over a signal line 106a.

An ANSam circuit 110 outputs an ANSam signal. The ANSam circuit 110 outputs the ANSam signal to a signal line 110a when a 1-level signal is output over a signal line 120d, and outputs no signal over the signal line 110a when a 0-level signal is output over the signal line 120d.

An adder 112 receives information from signal lines 108a and 110a, and outputs an added result over a signal line 112a. A reading circuit 114 reads an image of an original document, and outputs read image data over a signal line 114a. A recording circuit 116 records information output over a line 120e, sequentially one line by one line.

A memory circuit 118 stores unprocessed read information, coded information, received information and decoded information.

When a call signal detector circuit 122 detects a call signal in information coming via a signal line 102b, it outputs a 1-level signal over a signal line 122a. With no call signal detected, the call signal detector circuit 122 outputs a 0-level signal over the signal line 122a.

A telephone number detector circuit 124 detects a telephone number between call signals. When the detector circuit 124 detects telephone number information of a calling station between call signals while receiving information via the signal line 102b, it outputs the telephone number information over a signal line 124a.

A memory circuit 126 stores, via a signal line 126a, the destination of a communication arising from an error in the V. 8 and V. 34 procedures and a reception count obtained by decrementing a predetermined count (for example, 3 times) from the occurrence of the error.

When a call receiving operation starts and a telephone number is detected between call signals, the control circuit 120 stores it in its temporary buffer. When a communication error takes place in the middle of V. 8 and V. 34 procedures, the memory circuit 126 stores the telephone number and the value 3 as a predetermined count. When the same destination places a call next time, V. 21, V. 27 ter, V. 29 and V. 17 procedures are performed in conventional half duplex, because this destination is stored in the memory circuit 126. The predetermined count stored in the memory circuit 126 is decremented by 1, and then the decremented count is stored back in the memory circuit 126. When the decremented count reaches 0, the telephone number information and the predetermined count are cleared.

In contrast to the memory circuit 126, a memory circuit 128 uses an elapsed time from the occurrence of an error, rather than the reception count from the occurrence of the error, as a condition to shift to V. 21, V. 27 ter, V29 and V. 17 procedures in the event of the error in the V. 8 and V. 34 procedures. Specifically, the memory circuit 128 stores, via a signal line 128*a*, the destination of the communication in the event of an error in the V. 8 and V. 34 procedures and the time that is obtained by decrementing a predetermined time (30 minutes, for example) by an elapsed time from the occurrence of the error.

When a call receiving operation starts and a telephone number is detected between call signals, the control circuit 120 stores the telephone number in its temporary buffer. When a communication error takes place in the middle of V. 8 and V. 34 procedures, the memory circuit 128 stores the telephone number and 30 minutes as a predetermined time. Predetermined times are independently stored for a plurality of destinations. The predetermined times independently stored for the destinations are decremented by one minute for each one minute elapse. When the decremented time reaches 0 minute, the destination and the predetermined time are cleared from the memory circuit 126.

Since the memory circuit 126 continuously stores the destination for 30 minutes, the V. 21, V. 27 ter, V29, and V. 17 procedures are performed in half duplex communication within 30 minutes.

In this embodiment, the memory circuits 126 and 128 are not used concurrently.

Figure 11:
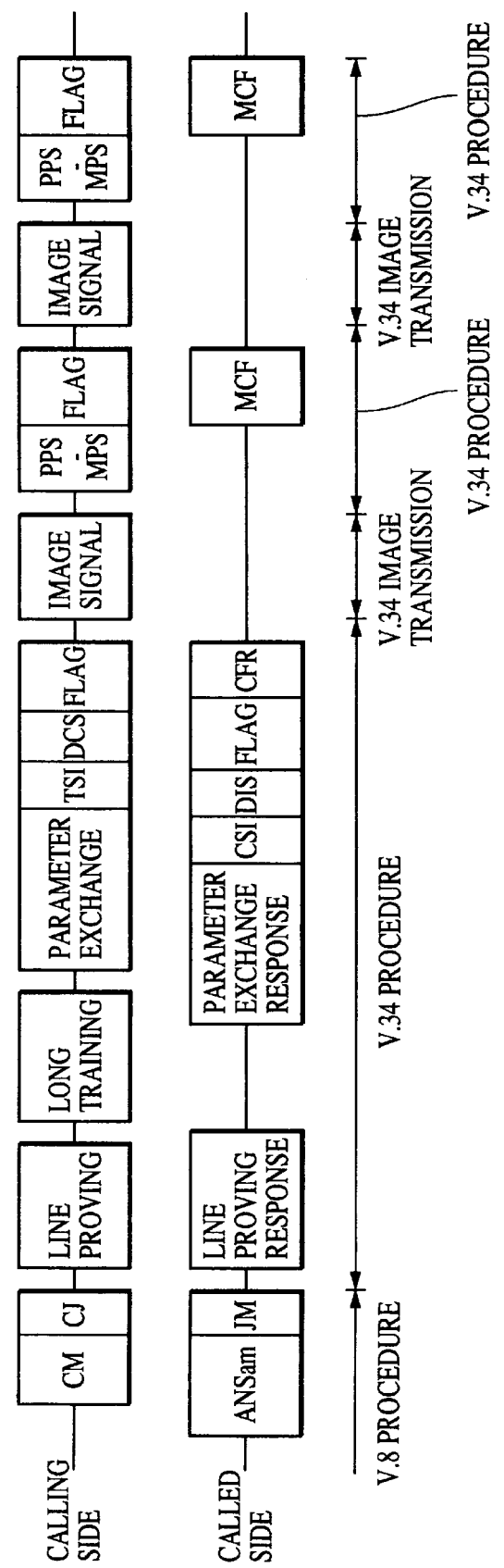
FIG. 11 is an explanatory view showing ITU-T Recommendations V. 8 and V. 34.

ITU-T Recommendations V. 8 and V. 34 are now specifically discussed. FIG. 11 is an explanatory view showing the V. 8 and V. 34 communication in this embodiment.

In FIG. 11, a called station sends an ANSam signal (2100 Hz signal modulated with a 15 Hz signal) that enables a full-duplex communication. A calling station transmits a CM signal that is modulated based on V. 8 to notify the called station of transmission modes on which an image is transmitted.

After receiving the CM signal, the called station notifies the calling station of transmission modes the called station can receive, out of the transmission modes specified by the CM signal. In response to a JM signal, the calling station transmits a CJ signal to notify the called station of the transmission mode to be used.

The calling station transmits, 50 ms after transmitting the CJ signal, a line proving signal (starting with an INFOoc signal) to check the condition of the telephone line. In response to the line proving signal, the called station transmits a signal (starting with an INFOoa signal). The called station further transmits to the calling station a transmitting level, the correction for amplitude and a transmission baud rate.

The calling station transmits, 50 ms after transmitting the line proving signal, a long training signal. Based on this signal, the called station adjusts an equalizer in a modem and performs timing detection.

The calling station transmits, 50 ms after transmitting the long training signal, transmits a parameter exchange signal. In response to the parameter exchange signal, the called station transmits a signal to notify the calling station of a link correction and a bit rate. In succession to the parameter exchange response signal, the called station transmits CSI (called subsriber identification) and DIS (digital identification signal) signals, and then transmits continuously a flag until it receives TSI (transmitting subscriber identification) and DCS (digital command signal) signals. After receiving the TSI and DCS signals, the called station transmits a CFR (confirmation to receive) signal.

After receiving the CSI and DIS signals, the calling station transmits the TSI and DCS signals, and transmits a flag until it receives the CFR signal. The calling station transmits, 50 ms after transmitting the flag signal, an image signal. After a time elapse of 50 ms from the end of the image signal transmission, the calling station transmits a PPS-MPS signal and then a flag until it receives an MCF signal. After receiving the PPS-MPS signal, the called station transmits the MCF (message confirmation signal) signal.

After a time elapse of 50 ms from the flag signal transmission, the calling station transmits the image signal, and after a time elapse of 50 ms from the end of the image signal transmission, the calling station transmits a PPS-EOP signal, and then a flag until it receives an MCF signal. After receiving the PPS-EOP signal, the called station transmits the MCF signal.

The control circuit 120 generally controls the facsimile apparatus. Particularly, in the third embodiment of the present invention, the control circuit 120 stores the telephone number information of a calling station when selecting a call reception operation, starts the V. 8 and V. 34 procedures, performs a predetermined times V. 21 procedure and V. 27 ter, V. 29, and V. 17 communication to the same calling station when a communication error occurs in the V. 8 and V. 34 procedures. The control circuit 120 detects the telephone number information of the calling station prior to a call connection, from the telephone number information between call signals.

Figure 12:
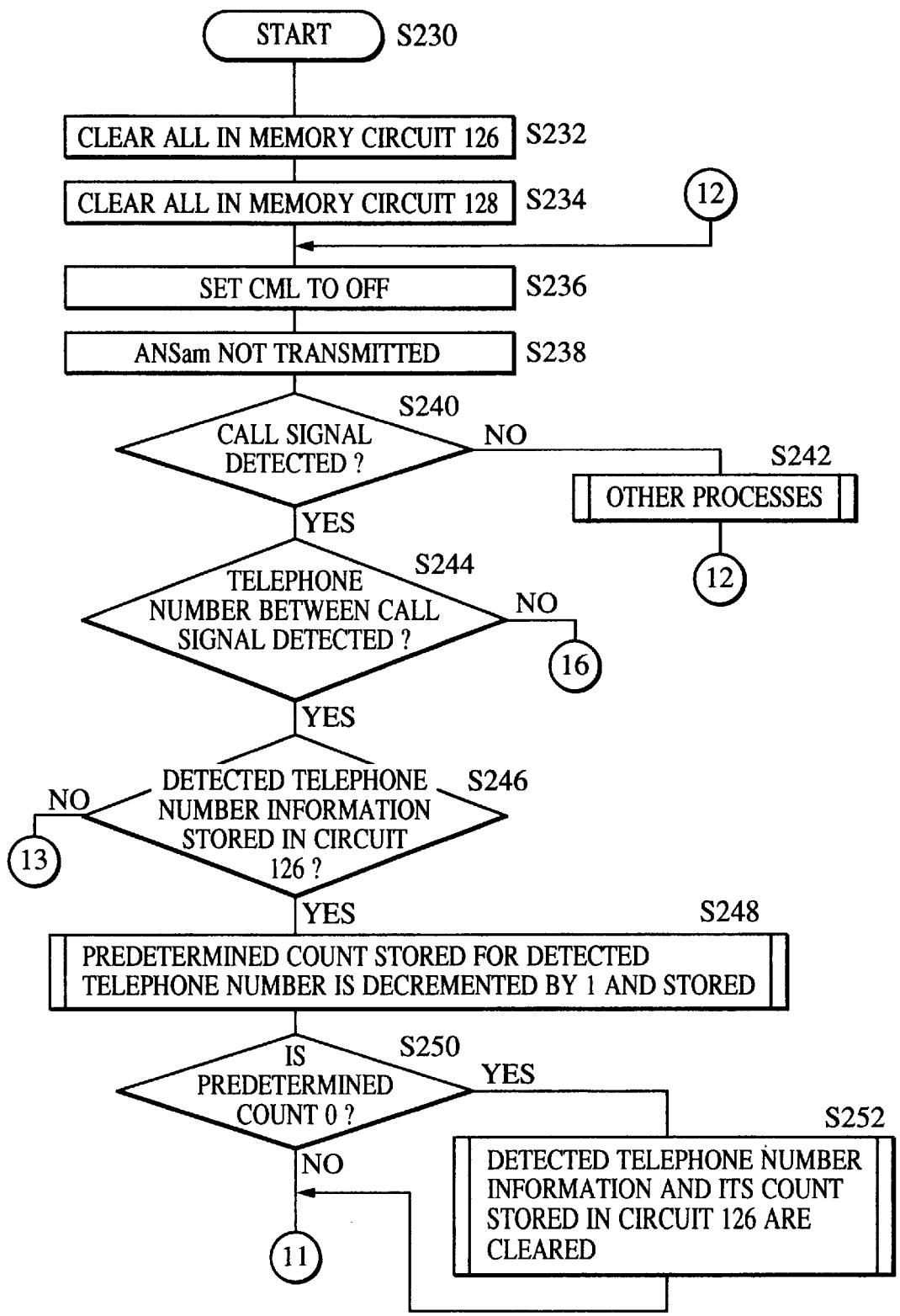
FIG. 12 is a flow diagram of the operation of the third embodiment.
Figure 13:
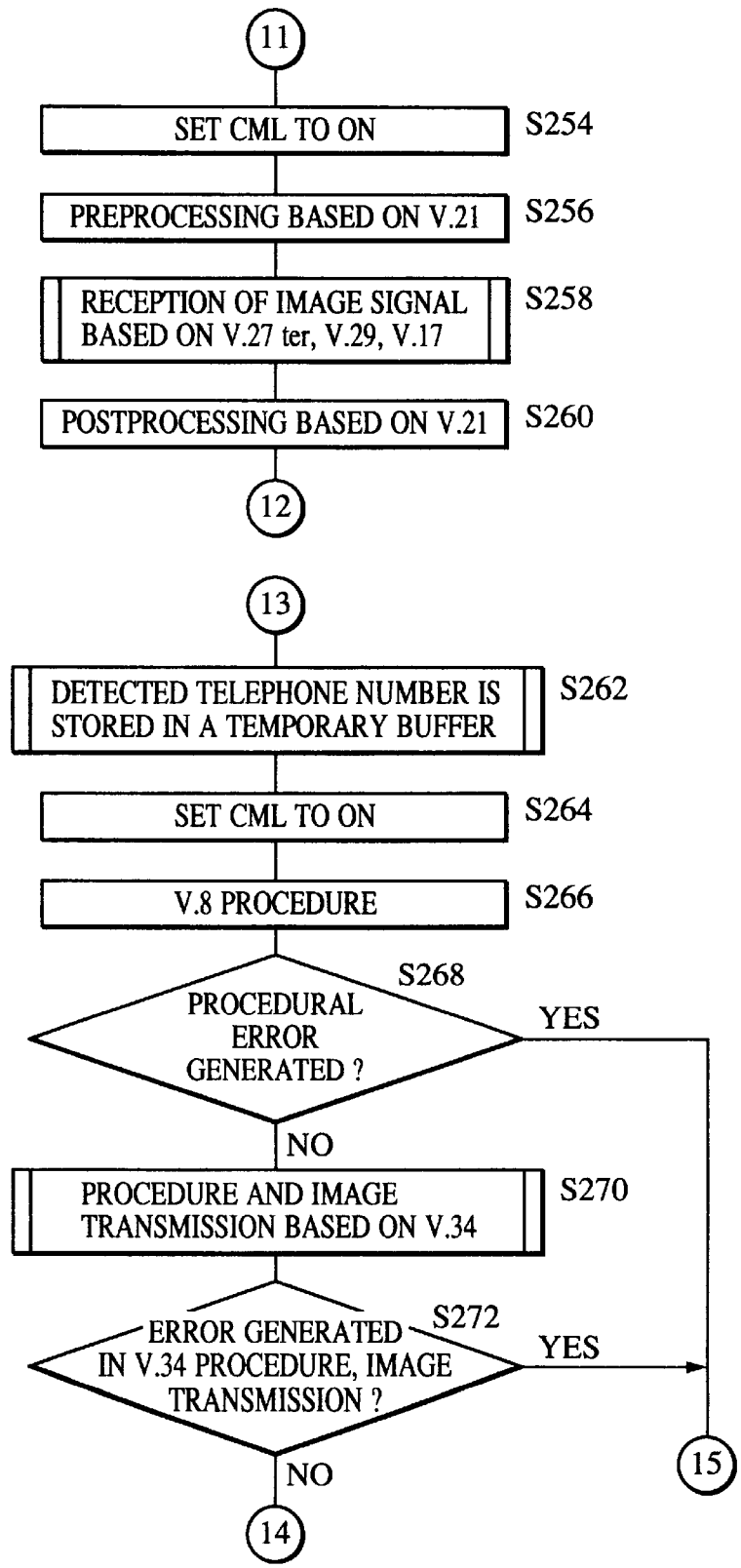
FIG. 13 is a flow diagram of the operation of the third embodiment.
Figure 14:
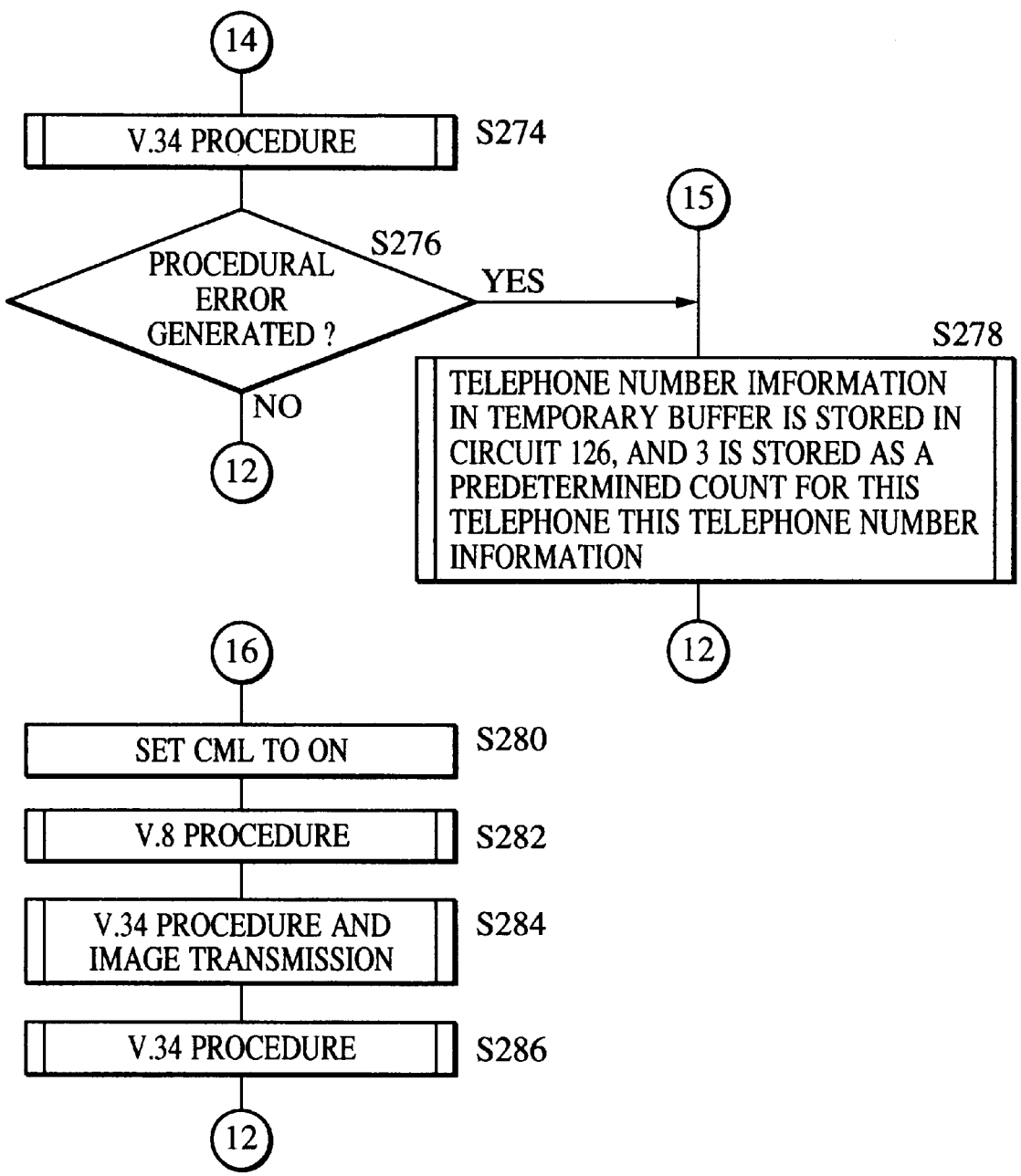
FIG. 14 is a flow diagram of the operation of the third embodiment.

FIGS. 12 through 14 are flow diagrams of the control flow of the operation of the control circuit 120 according to the third embodiment of the present invention.

The operation starts at step S230 in FIG. 12. At step S232, all memory in the memory circuit 126 is cleared via the signal line 126*a*. At step S234, all memory in the memory circuit 128 is cleared via the signal line 128*a*.

A 0-level signal is output over the signal line 120*a*, setting a CML to off at step S236. A 0-level signal output is output over the signal line 120*d*, inhibiting the ANSam signal from being output at step S238.

At step S240, the control circuit 120 receives the signal via the signal line 122*a* and determines whether a call signal is detected. With no call signal detected, the sequence goes to step S242 to perform other processes.

When a call signal is detected, the sequence goes to step S244. The control circuit 120 receives the signal via the signal line 124*a* and determines whether telephone number information is detected between call signals. When the telephone number information is detected, the sequence goes to step S246. With no telephone number information detected, the sequence goes to step S280.

At step S246, the control circuit 120 determines whether the detected telephone number information coming in via the signal line 124*a* is stored in the memory circuit 126. When it is stored in the memory circuit 126, the sequence goes to step S248. When it is not stored in the memory circuit 126, the sequence goes to step S262.

At step S248, a predetermined count stored in connection with the detected telephone number is decremented by 1 via the signal line 126*a* and the decremented count is stored back in the memory circuit 126. At step S250, a determination is made of whether the decremented count is 0. When it is 0, the detected telephone number information and its count stored in the memory circuit 126 are cleared via the signal line 126a at step S252, and the sequence goes to step S254. When the decremented count is not 0, the sequence directly goes to step S254.

If a communication error now takes place in the middle of the V. 8 and V. 34 communication with its total count of communications with the same destination being less than 3, a 1-level signal is output over the signal line 120a setting the CML to on at step S254. Thus, a preprocessing based on V. 21 (step S256), a reception of an image signal based on V. 27 ter, V. 29 and V. 17 (step S258), and a postprocessing based on V. 21 (step S260) are performed.

The detected telephone number is stored in a temporary buffer at step S262. At step S264, a 1-level signal is output over the signal line 120a, setting the CML to on.

At step S266, the V. 8 procedure is performed. When a procedural error occurs, the sequence goes to step S278. When no procedural error occurs (at step S268), the sequence goes to step S270.

The V. 34 procedure and image transmission are performed at step S270. When an error occurs in the V. 34 procedure and image transmission, the sequence goes to step S278. When no error occurs (at step S272), the sequence goes to step S274.

At step S274, the V. 34 procedure is performed. When no procedural error occurs, the sequence goes to step S236 for a normal ending. When a procedural error occurs, the sequence goes to step S278, where the telephone number information stored in the temporary buffer at step S262 is stored in the memory circuit 126, and the value 3 as a predetermined count corresponding to the telephone number information is also stored.

At step S280, a 1-level signal is output over the signal line 120a setting the CML to on. The V. 8 procedure is performed at step S282. The V. 34 procedure and image transmission are performed at step S284. The V. 34 procedure is performed at step S286, and then the sequence goes to step S236.

A fourth embodiment of the present invention is now discussed.

The V. 8 procedure and V. 34 communication start and an error occurs in the middle of the V. 8 procedure and V. 34 communication in the third embodiment. In the fourth embodiment, the V. 21 procedure and V. 27 ter, V. 29, and V. 17 communication are performed when a call is placed by the same destination within a predetermined time.

Figure 15:
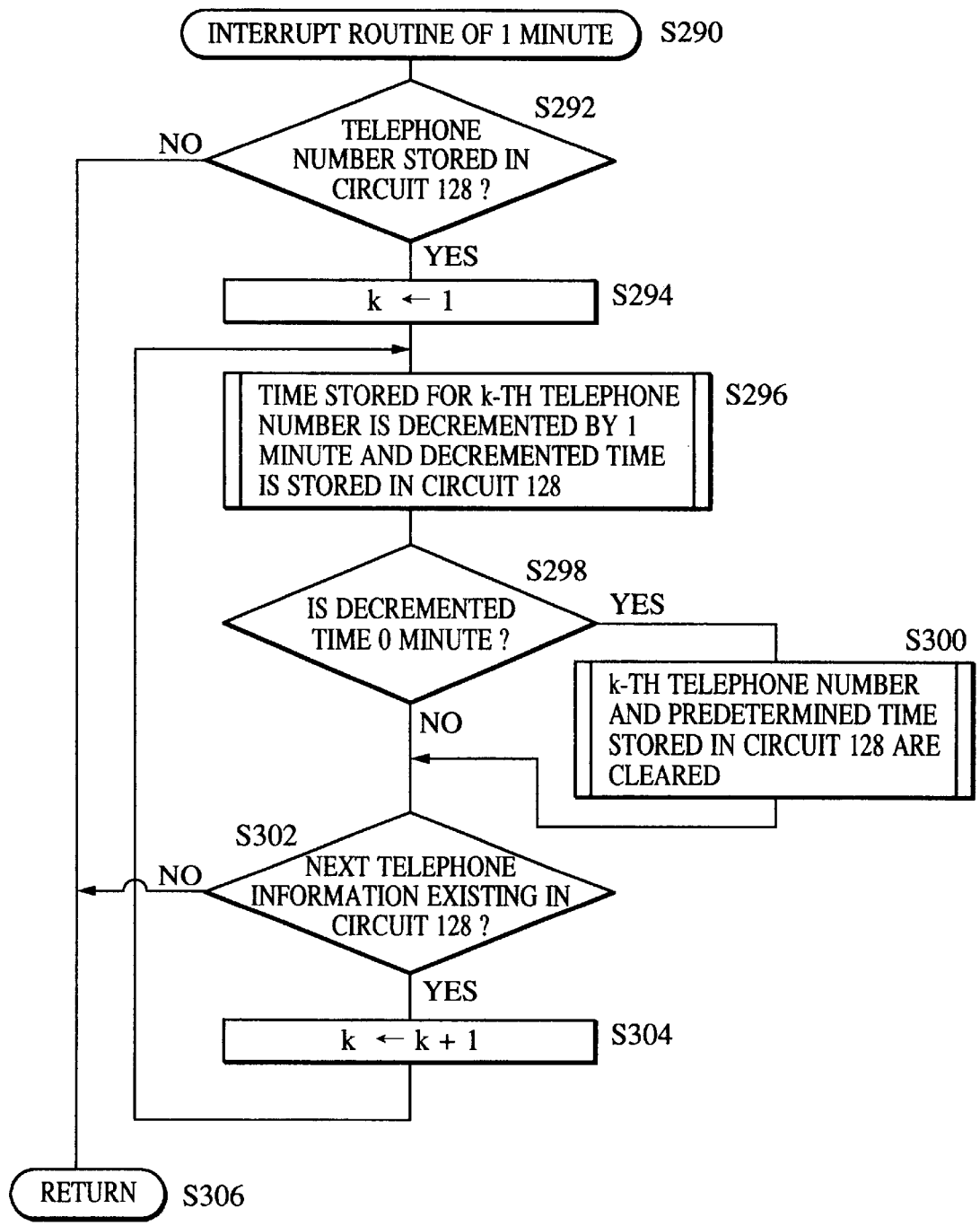
FIG. 15 is a flow diagram of the operation of the fourth embodiment.
Figure 16:
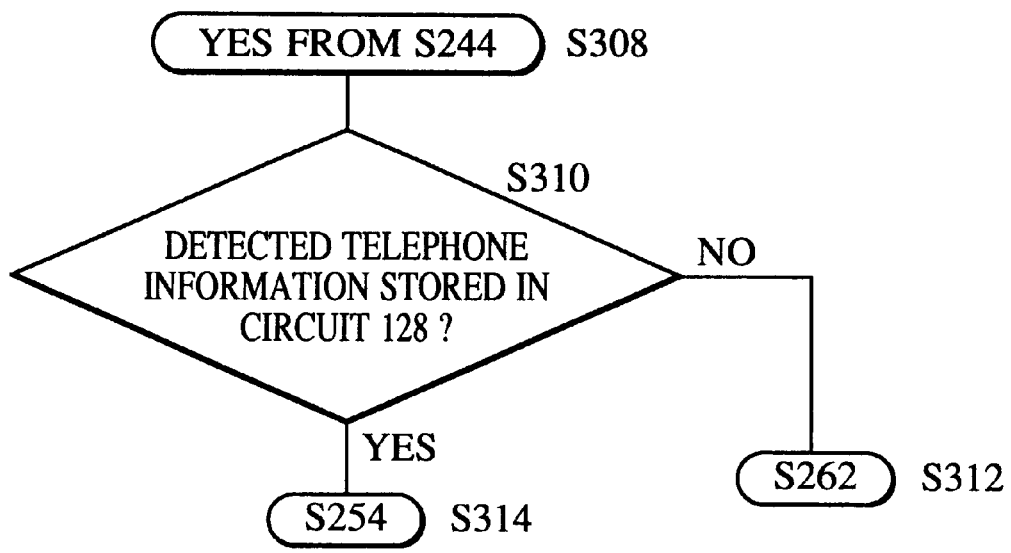
FIG. 16 is a flow diagram of the operation of the fourth embodiment.
Figure 16:
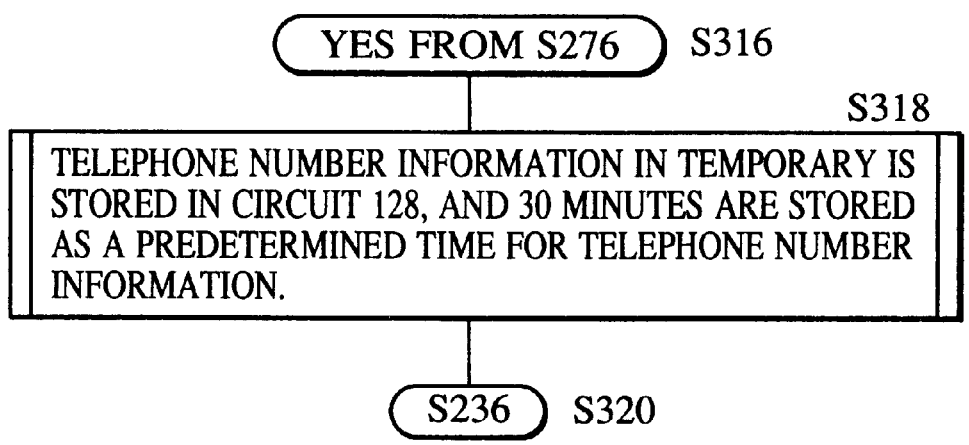

FIGS. 15 and 16 are flow diagrams of the control according to the fourth embodiment, which are different from those of the third embodiment (shown in FIGS. 12 through 14).

FIG. 15 shows an interrupt routine that is executed every minute. This interrupt routine is executed every minute regardless of wherever the main routine is followed.

Step S290 represents an interrupt process every 1 minute. At step S292, the control circuit 120 receives information via the signal line 128a to determine whether telephone number information is stored in the memory circuit 128. When the telephone number information is not stored there, the sequence returns to step S306 for initial state.

When the telephone number information is stored there, the sequence goes to step S294, where a counter k is set to 1. At step S296, the stored time is decremented by 1 minute in connection with the k-th telephone number information stored in the memory circuit 128, and then the decremented time is stored back in the memory circuit 128 via the signal line 128a.

At step S298, a determination is made of whether the decremented time is 0 minute. When it reaches 0 minute, the sequence goes to step S300, where the k-th telephone number information and its predetermined time stored in the memory circuit 128 are cleared via the signal line 128a. The sequence goes to step S302. When the decremented time is not 0 minute, the sequence directly goes to step S302.

At step S302, a determination is made of whether next telephone information is stored in the memory circuit 128. When it is not stored there, the sequence goes to step S306 for the initial state. When the next telephone number information is stored in the memory 128, the sequence goes to step S304, where the count at the counter k is incremented by 1. The sequence goes to step S296.

Step S308 in FIG. 16 corresponds to "yes" at step S244. At step S310, a determination is made of whether the detected telephone number information between call signals is stored in the memory circuit 128 via the signal line 128a. When it is stored there, the sequence goes to step S314 (S254). When it is not stored there, the sequence goes to step S312 (S262).

Step S316 corresponds to "yes" at step S276. At step S318, the telephone number information stored in the temporary buffer is stored in the memory circuit 128, and 30 minutes as a predetermined time corresponding to the telephone number information are also stored there. At step S320, the sequence goes to step S236.

A fifth embodiment of the present invention is now discussed.

Figure 17:
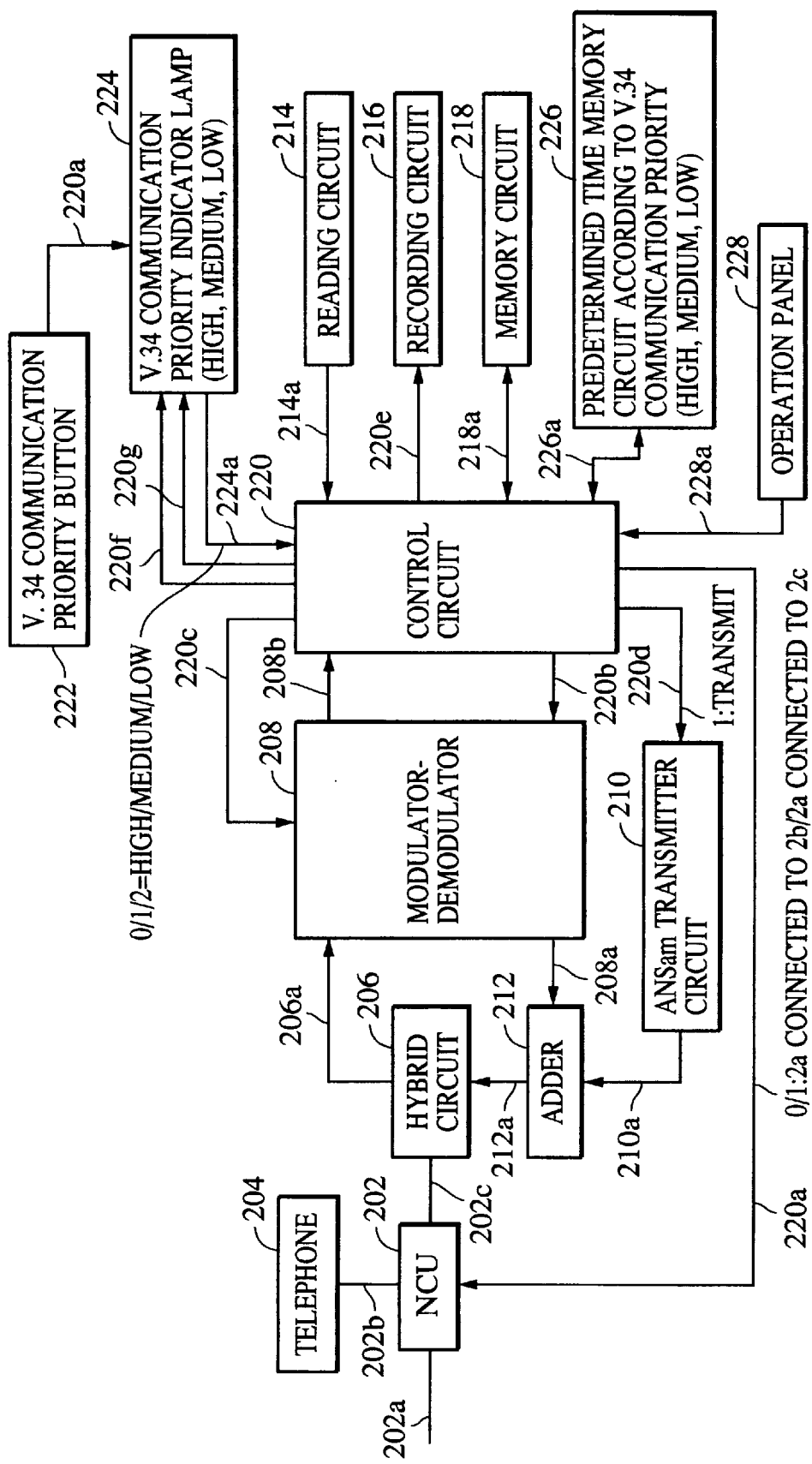
FIG. 17 is a block diagram of a fifth embodiment of the present invention.
Figure 18:
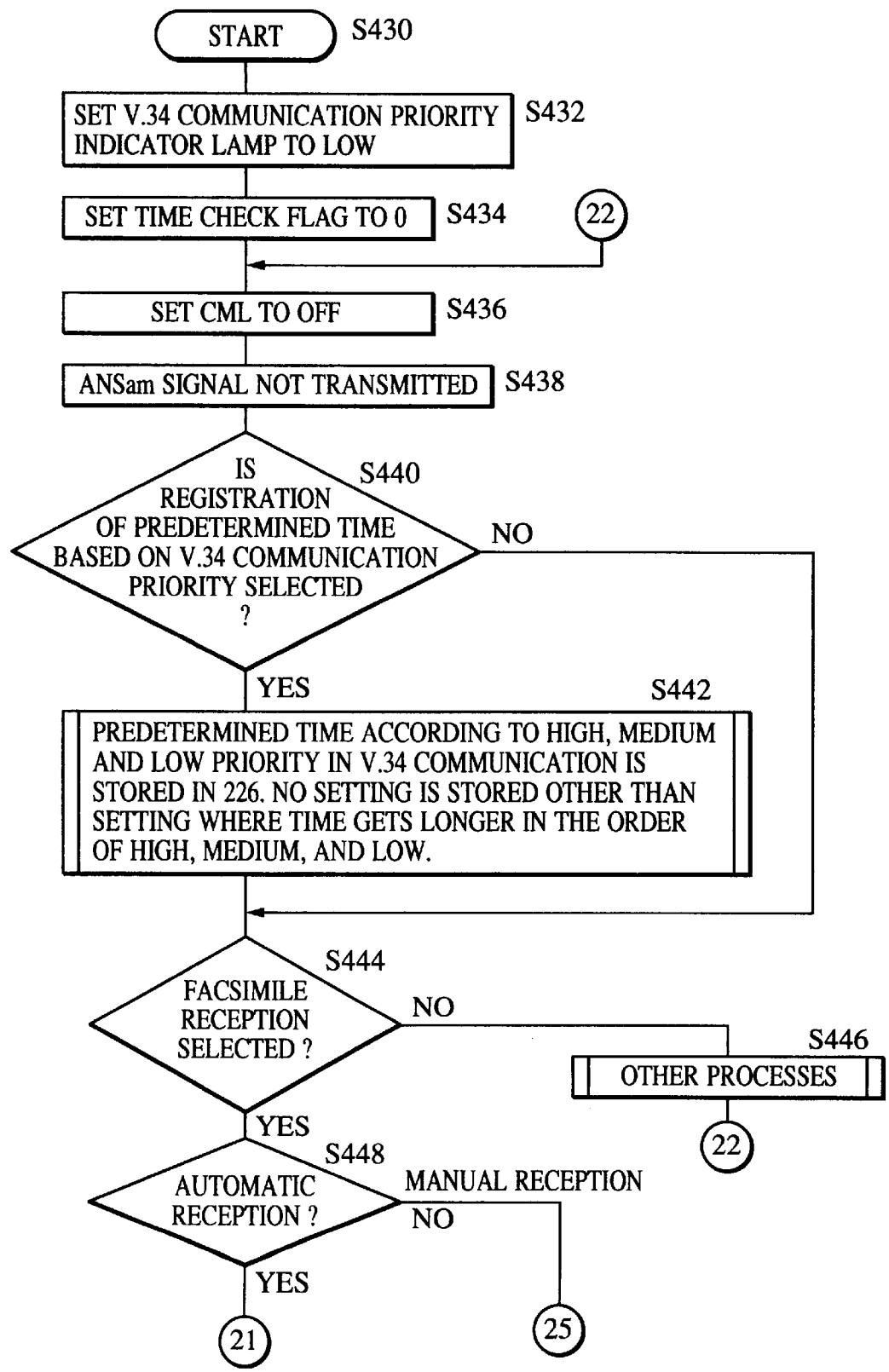
FIG. 18 is a flow diagram of the operation of the fifth embodiment.
Figure 19:
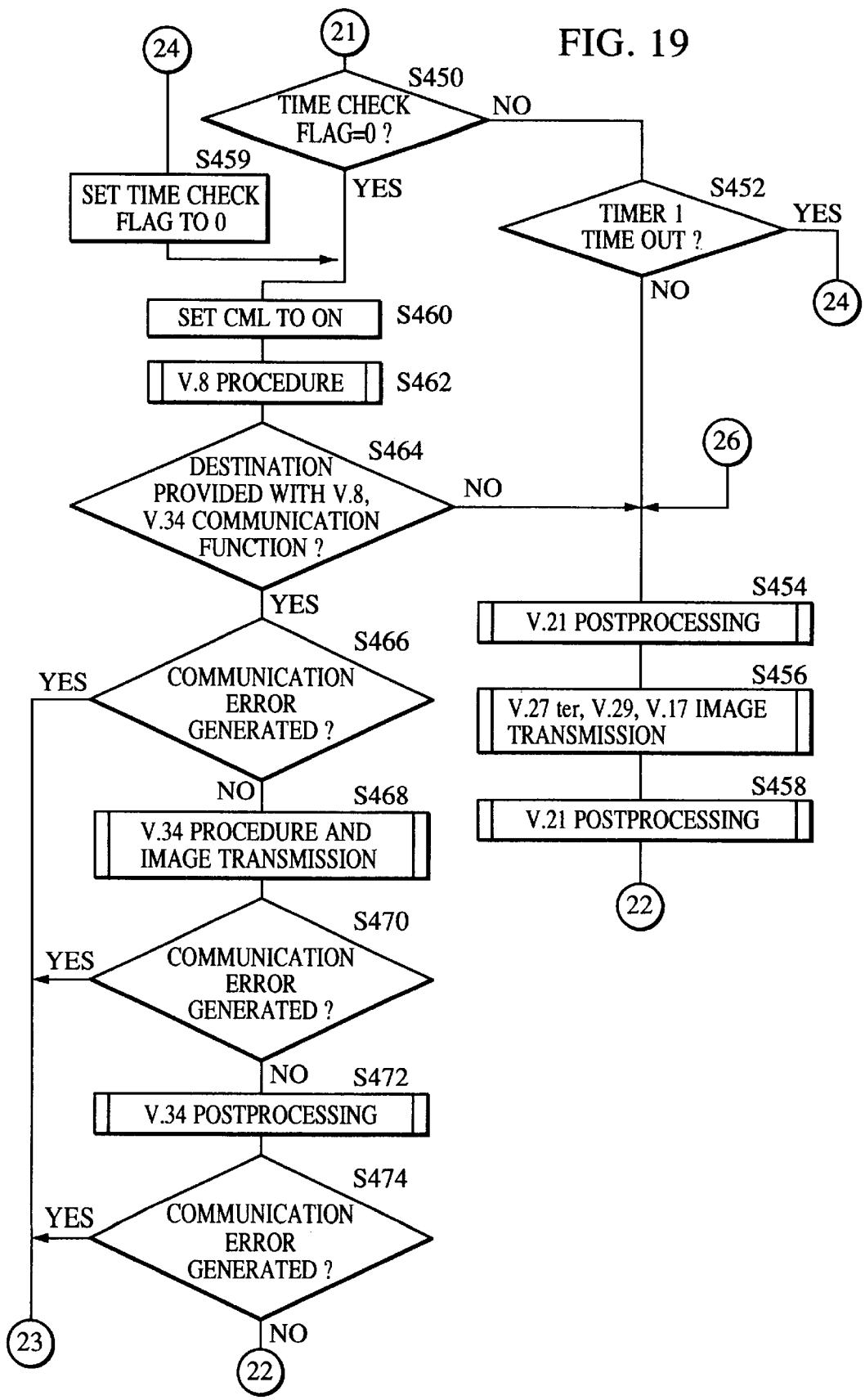
FIG. 19 is a flow diagram of the operation of the fifth embodiment.
Figure 20:
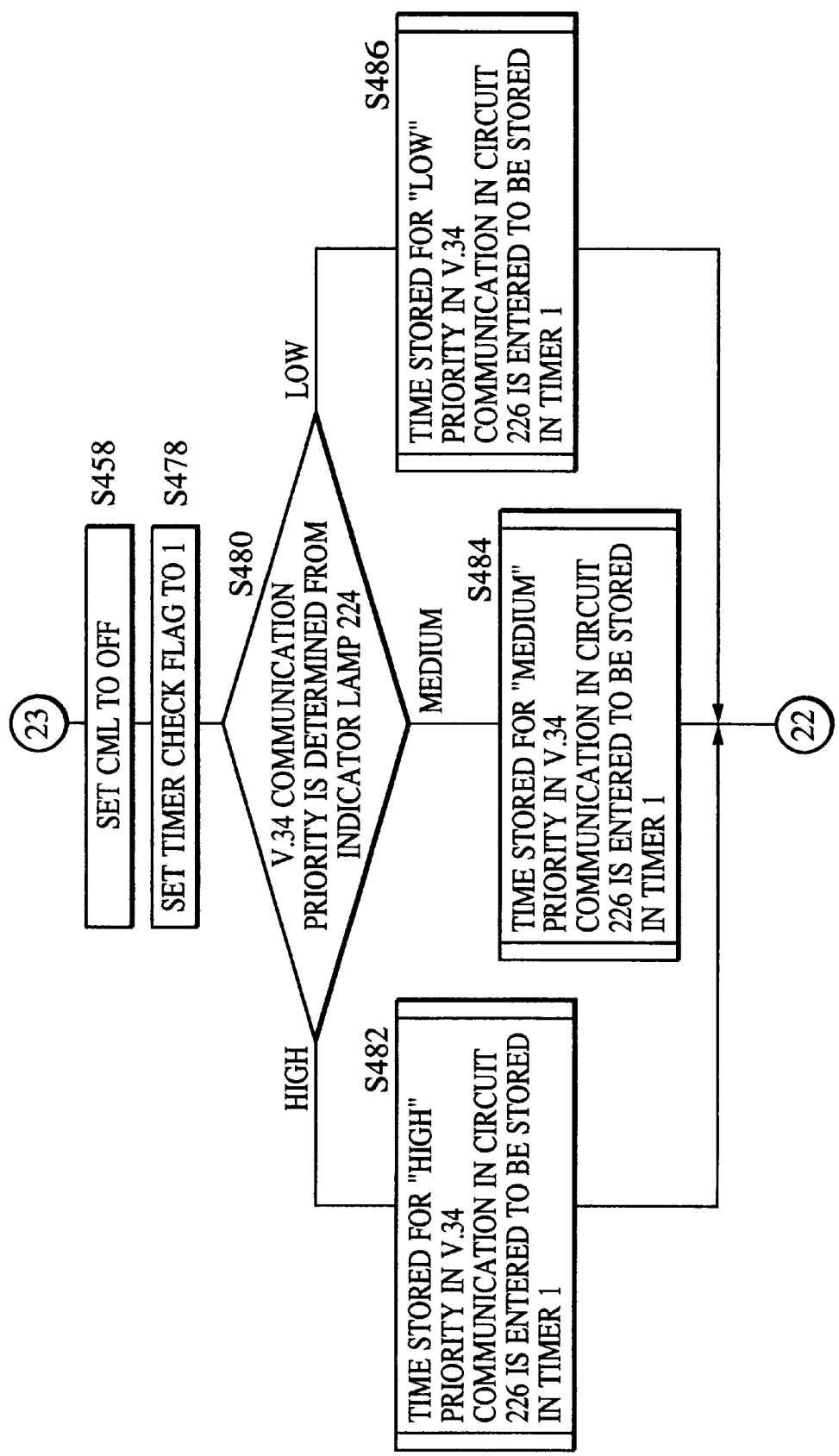
FIG. 20 is a flow diagram of the operation of the fifth embodiment.
Figure 21:
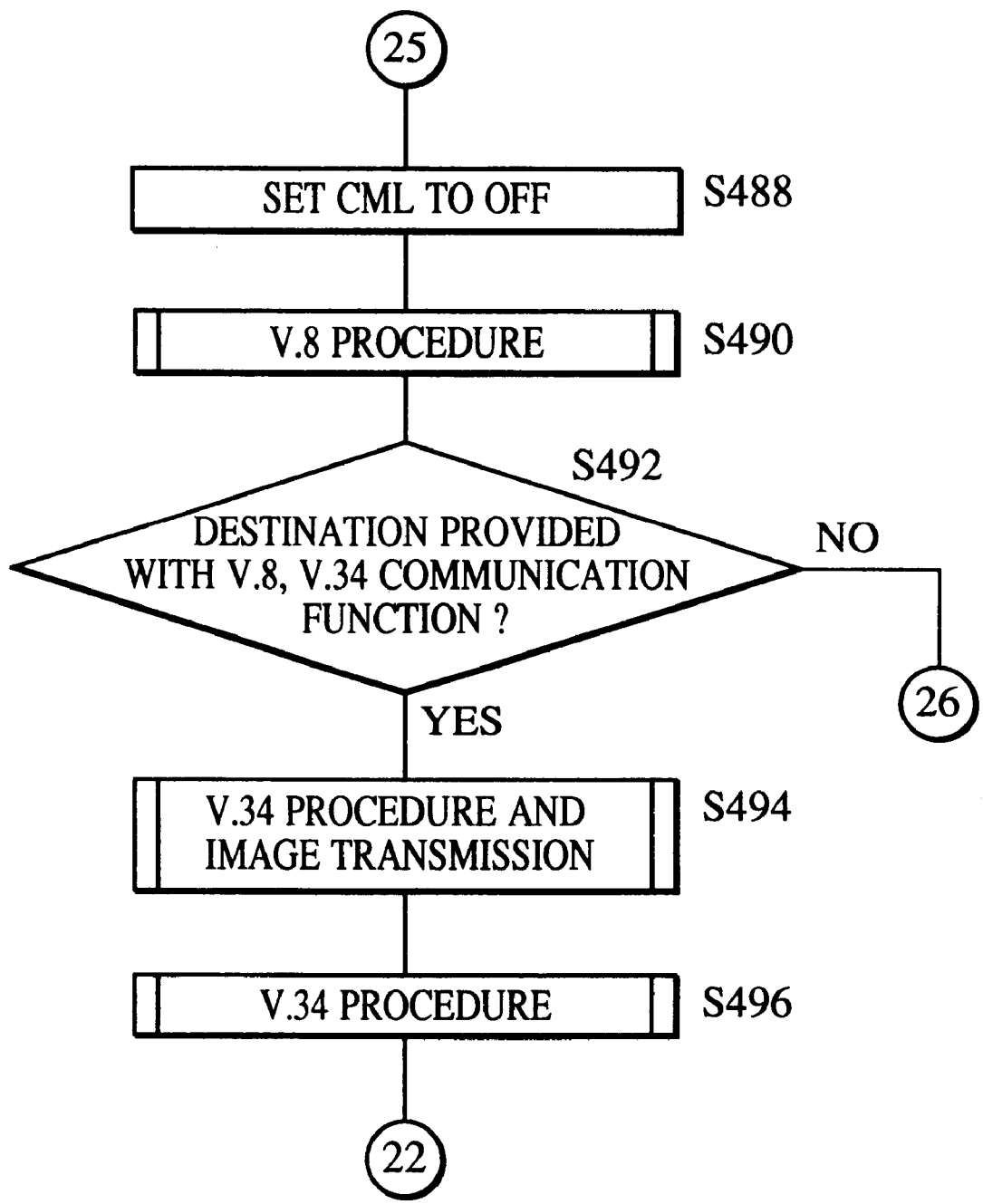
FIG. 21 is a flow diagram of the operation of the fifth embodiment.

FIG. 17 is a block diagram showing the facsimile apparatus in which the fifth embodiment is incorporated.

NCU202 connected to the line of a telephone grid controls connection with the telephone grid, switches to data communications line, and retains a loop to use the telephone grid for data communications. NCU202 connects a telephone line 202a to a telephone 204 when a control circuit 220 gives a 0-level signal (on a signal line 220a), and connects the telephone line 202a to the facsimile apparatus when a 1-level signal is given. In normal operation status, the telephone line 202a remains connected to the telephone 204.

A hybrid circuit 206 isolates transmitted signals from received signals, supplies transmitted signals from an adder 212 to the telephone line 202a via NCU202, receives signals from other linked stations via NCU202 and sends the received signal to a modulator-demodulator 208 via signal line 206a.

The modulator-demodulator 208 performs modulation and demodulation based on ITU-T Recommendations V. 8, V. 21, V. 27 ter, V. 29, V. 17, and V. 34, and is instructed to perform the respective transmission modes via a signal line 220c. The modulator-demodulator 208 outputs modulated data over a signal line 208a while receiving a signal output over a signal line 220b, and outputs demodulated data over a signal line 208b while receiving a signal output over a signal line 206a.

An ANSam circuit 210 outputs an ANSam signal. The ANSam circuit 210 outputs the ANSam signal to a signal line 210a when a 1-level signal is output over a signal line 220d, and outputs no signal over the signal line 210a when a 0-level signal is output over the signal line 220d.

An adder 212 receives information from signal lines 208a and 210a, and outputs an added result over a signal line 212a. A reading circuit 214 reads an image of an original document, and outputs read image data over a signal line 214a. A recording circuit 216 records information output over a line 220e, sequentially one line by one line.

A memory circuit 218 stores unprocessed read information, coded information, received information and decoded information.

When an error occurs in the V. 8 procedure, V. 34 procedure and V. 34 image transmission, the V. 21 procedure and V. 27 ter, V. 29, and V. 17 image transmission will be performed if a call is placed within a predetermined time from the occurrence of the error. The V. 34 predetermined time is set at high, medium and low priority levels. A communication priority button 222 is available for this setting. With the button 222 pressed, a button pulse is output over a signal line 222a.

A indicator lamp circuit 224 indicates the V. 34 priority at one of the three levels: high, medium and low. When a light pulse is output over a signal line 220g with a 0-level signal output over a signal line 220f, the letter "H" (for high) is presented on a indicator lamp. With a 1-level signal over the signal line 220f, the letter "M" (for medium) is presented. With a 2-level signal over the signal line 220f, the letter "L" (for low) is presented. The indicator lamp cycles through "H," "M, " and "L" each time the button pulse is generated on the signal line 222a. When "H" is presented, a 0-level signal is output over the signal line 224a. When "M" is presented, a 1-level signal is output over the signal line 224a. When "L" is presented, a 0-level signal is output over the signal line 224a.

When a communication error occurs in the execution of the V. 8 procedure, V. 34 procedure and V. 34 image transmission, the execution of the V. 21 procedure, V. 27 ter, V. 29, and V. 17 image transmission is carried out in response to a call that is made within a predetermined time from the error. A memory circuit 226 stores that predetermined time depending on the H, L, and M priority level settings. In this case, the predetermined time gets longer in the order of high, medium and low. Prolonging the predetermined time during the execution of the V. 8 procedure, V. 34 procedure and V. 34 image transmission is translated into a longer time of execution of the V. 21 procedure and V. 27 ter, V. 29 and V. 17 image transmission subsequent to the occurrence of the error, and means that a lower priority is given to the V. 34 communication.

An operation panel 228 comprises a memory key for the memory circuit 226, numerical keys, a one touch dial key, an abbreviated dial key, a start key, an asterisk (*) key, a sharp (#) key, and other function keys. Information corresponding to any pressed key is output over a signal line 228a.

The control circuit 220 generally controls the facsimile apparatus. Particularly, in the fifth embodiment, the control circuit 220 performs the V. 8 procedure, V. 34 procedure, V. 34 image transmission when selecting a call reception operation, responds in the V. 21 procedure in response to a call within a predetermined time from an error when the error took place in the execution of the V. 8 procedure, V. 34 procedure and V. 34 image transmission, and performs the V. 21 procedure, and V. 27 ter, V. 29, and V. 17 image transmission. Using the V. 34 communication priority button 222, the length of the predetermined time is changed. Specifically, the higher the priority given to the V. 34 communication, the shorter the predetermined time is set. The above control works in an automatic call reception only. In a manual call reception, a communication is always performed in a fixed transmission mode.

FIGS. 18 through 21 are flow diagrams showing the control flow in the operation of the control circuit 220 according to the fifth embodiment.

The operation starts at step S430. At step S432, after a 2-signal is output over the signal line 220f, a light pulse is output over the signal line 220g causing the V. 34 communication priority indicator lamp 224 to light the letter "L." At step S434, a timer check flag is set to 0.

A 0-level signal is output over the signal line 220a, setting a CML to off at step S436. At step S438, a 0-level signal is output over the signal line 220d, inhibiting the ANSam signal from being output.

At step S440, the control circuit 220 receives information via the signal line 228a to determine whether the registration of a predetermined time corresponding to the V. 34 communication priority is selected. When the registration of the predetermined time is selected, the sequence goes to step S442, where the predetermined time at one of high, medium and low levels of the V. 34 communication priority is stored in the memory circuit 226 via its signal line 226a. No setting is allowed other than a setting in which the predetermined time gets longer in the order of high, medium and low levels.

At step S444, a determination is made of whether a facsimile reception is selected. When it is selected, the sequence goes to step S448. When it is not selected, the sequence goes to step S446 to perform other processes.

At step S448, a determination is made of whether a call reception is automatic. When it is automatic, the sequence goes to step S450. When it is manual, the sequence goes to step S488.

At step S450, a determination is made of whether the timer check flag is 0. When the flag is 0, the sequence goes to step S460, because it is not within the predetermined time from a communication error in the V. 8 and V. 34 communication. When the flag is 1, the sequence goes to step S452, because it is within the predetermined time from the error in the V. 8 and V. 34 communication.

At step S452, a determination is made of whether a timer 1 times out, namely whether the predetermined time that was set in the memory circuit 226 referring to the V. 34 communication priority indicator lamp 224 has elapsed since the communication error in the V. 8 and V. 34 communication. When the timer 1 times out, the sequence goes to step S459, where the timer check flag is set to 0. When the timer 1 has not yet timed out, the V. 21 procedure (S454), V. 27 ter, V. 29 and V. 17 image transmission (S456), and V. 21 post-processing (S458) are executed such that a stable communication is assured by preventing the recurrence of error in the V. 8 and V. 34 communication.

A 0-level signal is output over the signal line 220a, setting the CML to off at step S460. At step S462, the V. 8 procedure is performed. At step S464, a determination is made of whether a destination station has the V. 8 and V. 34 communication capability. When the destination station is provided with the V. 8 and V. 34 communication capability, the sequence goes to step S466. If the destination station is not, the sequence goes to step S454.

At step S466, a determination is made of whether a communication error occurred in the V. 8 procedure at step S462. When an error is detected, the sequence goes to step S476. When no error is detected, the sequence goes to step S468.

The V. 8 procedure and V. 34 image transmission are performed at step S468. At step S470, a determination is made of whether a communication error occurred in the V.

34 procedure and V. 34 image transmission at step S468. When an error is detected, the sequence goes to step S476. When no error is detected, the sequence goes to step S472.

The V. 34 procedure is performed at step S472. At step S474, a determination is made of whether a communication error occurred in the postprocessing in the V. 34 procedure at step S472. When an error is detected, the sequence goes to step S476. When no error is detected, the sequence goes to step S436.

A 0-level signal is output over the signal line 220a, setting the CML to off at step S476. The timer check flag is set to 1 at step S478. The timer needs checking because a communication error occurred in the V. 8 and V. 34 communication.

At step S480, the control circuit 220 determines the V. 34 communication priority by receiving information via the signal line 224a. When the priority is "H," the sequence goes to step S482, where the time corresponding to "H" priority of the V. 34 communication stored in the memory circuit 226 is entered via the signal line 226a and is then stored in the timer 1. When the priority is "M," the sequence goes to step S484, where the time corresponding to "M" priority of the V. 34 communication stored in the memory circuit 226 is entered via the signal line 226a and is then stored in the timer 1. When the priority is "L," the sequence goes to step S486, where the time corresponding to "L" priority of the V. 34 communication stored in the memory circuit 226 is entered via the signal line 226a and is then stored in the timer 1. Then, the sequence goes to step S436.

A 1-level signal is output over the signal line 220a, setting the CML to on at step S488. The V. 8 procedure is performed at step S490. At step S492, a determination is made of whether the destination station has the V. 8 and V. 34 communication capability. When the destination station is provided with the V. 8 and V. 34 communication capability, the sequence goes to step S494. When the destination station is not provided with the same capability, the sequence goes to step S454.

The V. 34 procedure and V. 34 image transmission are performed at step S494. The postprocessing in the V. 34 procedure is performed at step S496, and then the sequence goes to step S436.

A sixth embodiment of the present invention is now discussed.

Figure 22:
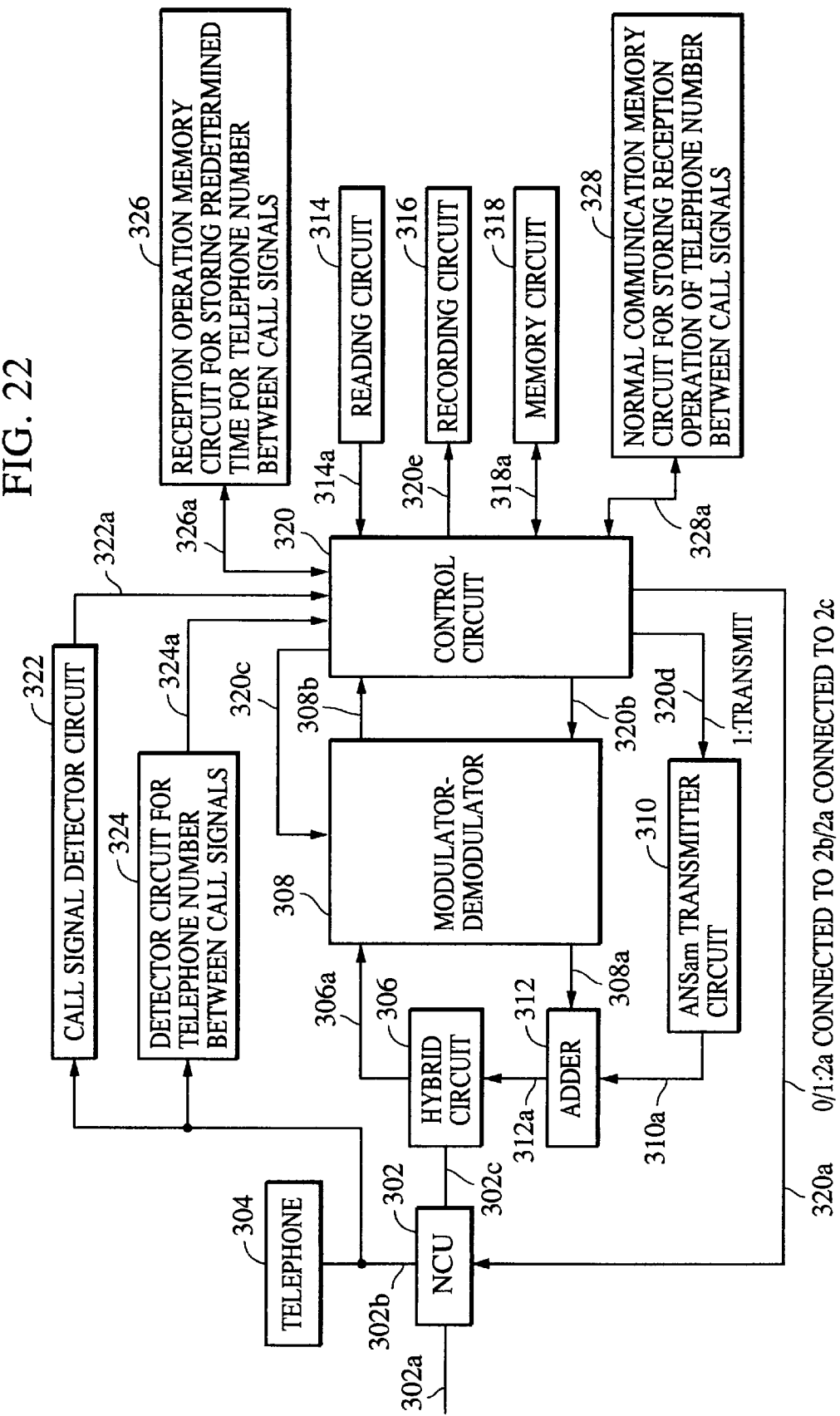
FIG. 22 is a block diagram of sixth and seventh embodiments of the present invention.

FIG. 22 is a block diagram showing a facsimile apparatus in which sixth and seventh embodiments of the present invention are incorporated.

NCU302 connected to the line of a telephone grid controls connection with the telephone grid, switches to data communications line, and retains a loop to use the telephone grid for data communications. NCU302 connects a telephone line 302a to a telephone 304 when a control circuit 320 gives a 0-level signal (on a signal line 320a), and connects the telephone line 302a to the facsimile apparatus when a 1-level signal is given. In normal operation status, the telephone line 302a remains connected to the telephone 304.

A hybrid circuit 306 isolates transmitted signals from received signals, supplies transmitted signals from an adder 312 to the telephone line 302a via NCU302, receives signals from other lined stations via NCU302 and sends the received signal to a modulator-demodulator 308.

The modulator-demodulator 308 performs modulation and demodulation based on ITU-T Recommendations V. 8, V. 21, V. 27 ter, V. 29, V. 17, and V. 34, and is instructed to perform the respective transmission modes via a signal line 320c. The modulator-demodulator 308 outputs modulated data over a signal line 308a while receiving a signal output over a signal line 220b, and outputs demodulated data over a signal line 308b while receiving a signal output over a signal line 306a.

An ANSam circuit 310 outputs an ANSam signal. The ANSam circuit 310 outputs the ANSam signal to a signal line 310a when a 1-level signal is output over a signal line 320d, and outputs no signal over the signal line 310a when a 0-level signal is output over the signal line 320d.

An adder 312 receives information from signal lines 308a and 310a, and outputs an added result over a signal line 312a. A reading circuit 314 reads an image of an original document, and outputs read image data over a signal line 314a. A recording circuit 316 records information output over a line 320e, sequentially one line by one line.

A memory circuit 318 stores unprocessed read information, coded information, received information and decoded information.

A call signal detector circuit 322 detects a call signal. When the call signal detector circuit 322 detects a call signal via a signal line 302b, it outputs a 1-level signal over a signal line 322a. With no call signal detected, the call signal detector circuit 322 outputs a 0-level signal over the signal line 322a.

A telephone number detector circuit 324 detects a telephone number of a calling station between call signals. When the detector circuit 324 detects telephone number information between call signals via the signal line 302b, it outputs the telephone number information of the calling station over a signal line 324a.

When the V. 8 and V. 34 communication is selected in response to the telephone number between the call signals and ends with an error, the transmission mode is controlled within a predetermined time (30 minutes, for example) from the occurrence of the error. A memory circuit 326 stores the predetermined time in connection with the telephone number and call reception operation via a signal line 326a.

A memory circuit 328 stores, via a signal line 328a, the call reception operation corresponding to each telephone number between call signals and the count that is relaxed by one level from a predetermined count (3 times, for example) at each normal communication.

A control circuit 320 generally controls the facsimile apparatus. Particularly, in the sixth embodiment of the present invention, when the V. 8 and V. 34 communication is performed after detecting a call signal and ends with an error, the communication with the same destination is performed for a predetermined time (30 minutes, for example) from the occurrence of the error, in accordance with the content of the error based on one of the following transmission modes: one not using V.8 and V. 34 procedures, one performing V. 8 and V. 34 procedures but with its baud rate limited, and one performing V. 8 and V. 34 procedures but with its bit rate limited. After the predetermined time has elapsed, this limitation is lifted.

Figure 23:
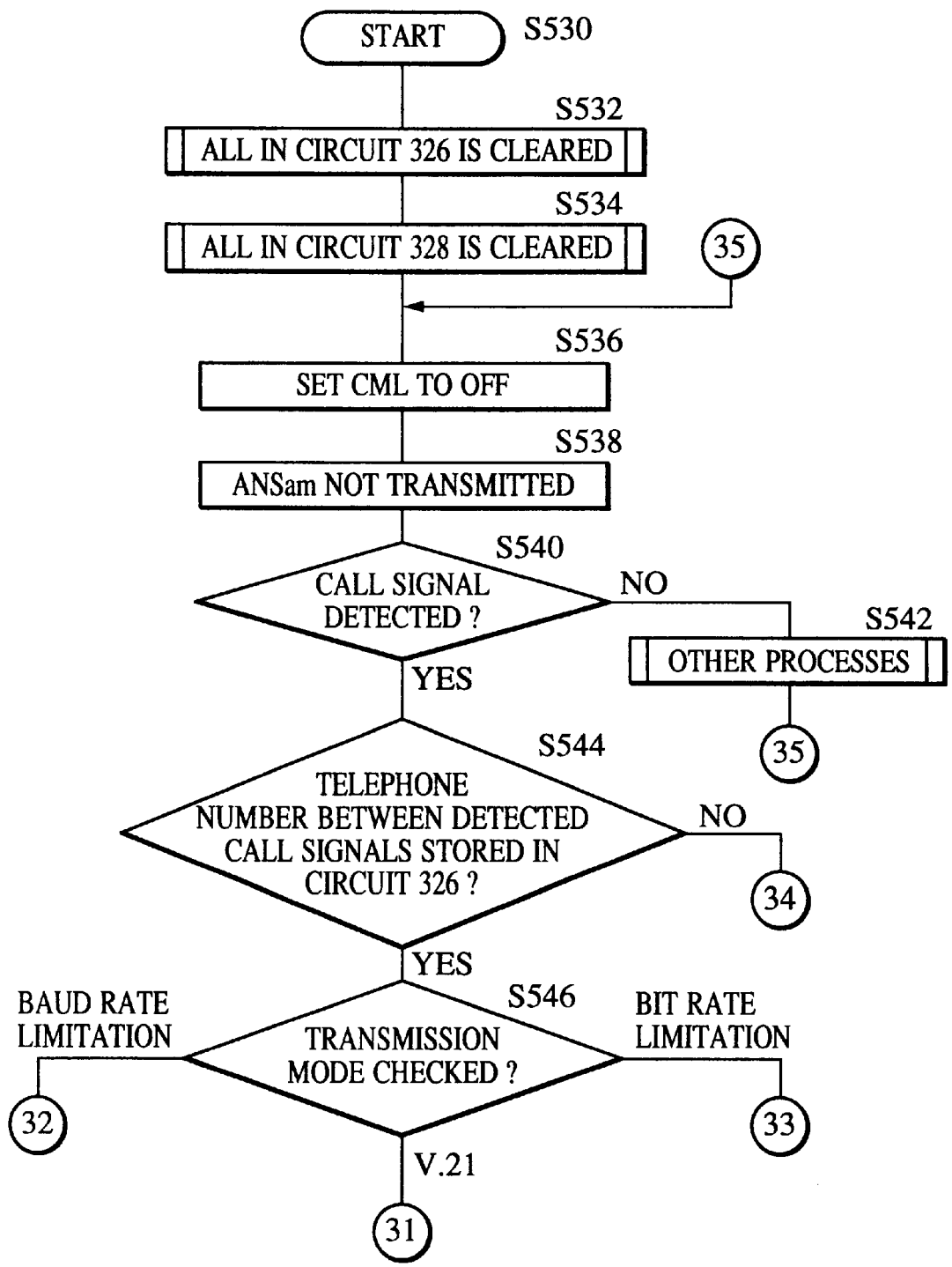
FIG. 23 is a flow diagram of the operation of the sixth embodiment.
Figure 24:
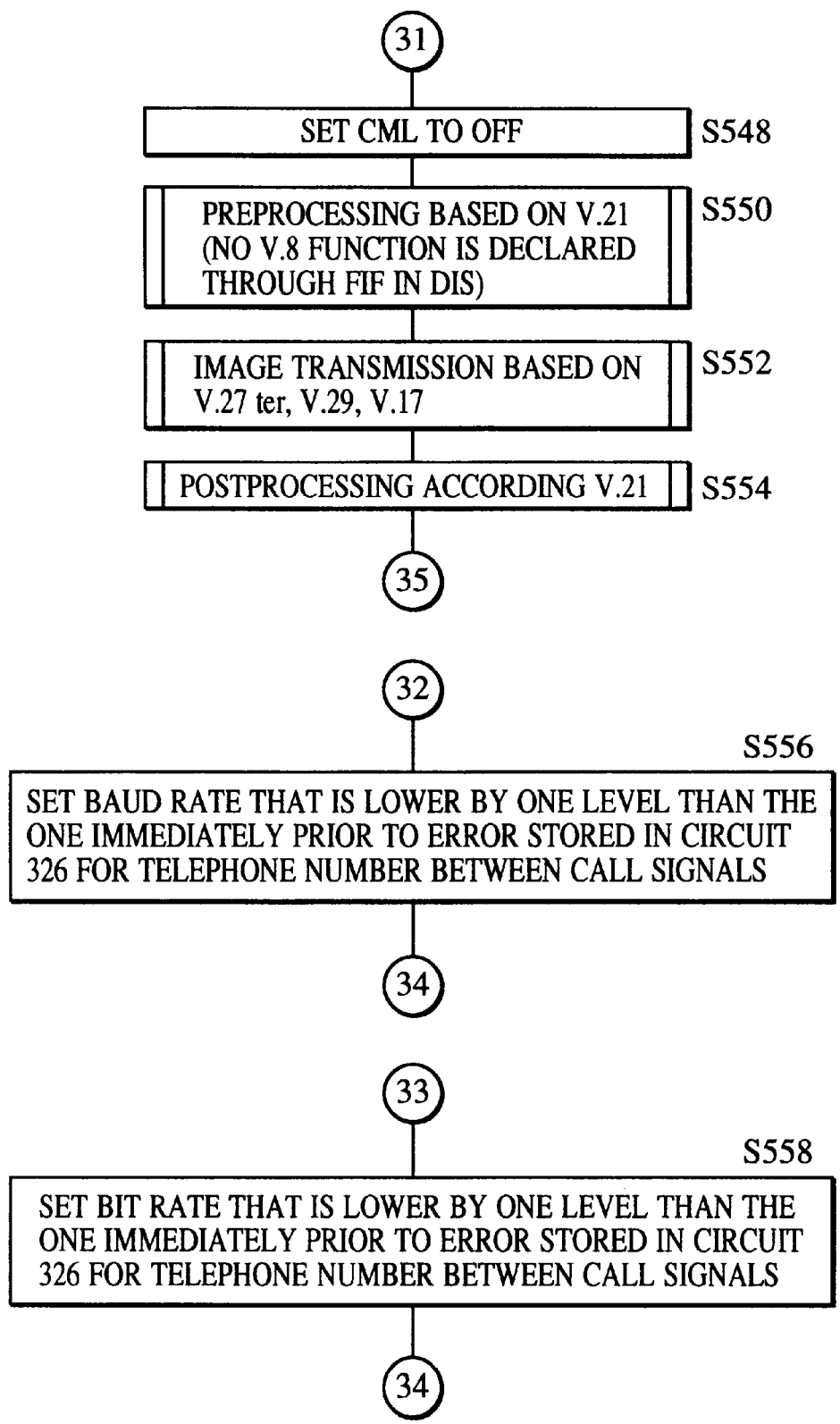
FIG. 24 is a flow diagram of the operation of the sixth embodiment.
Figure 25:
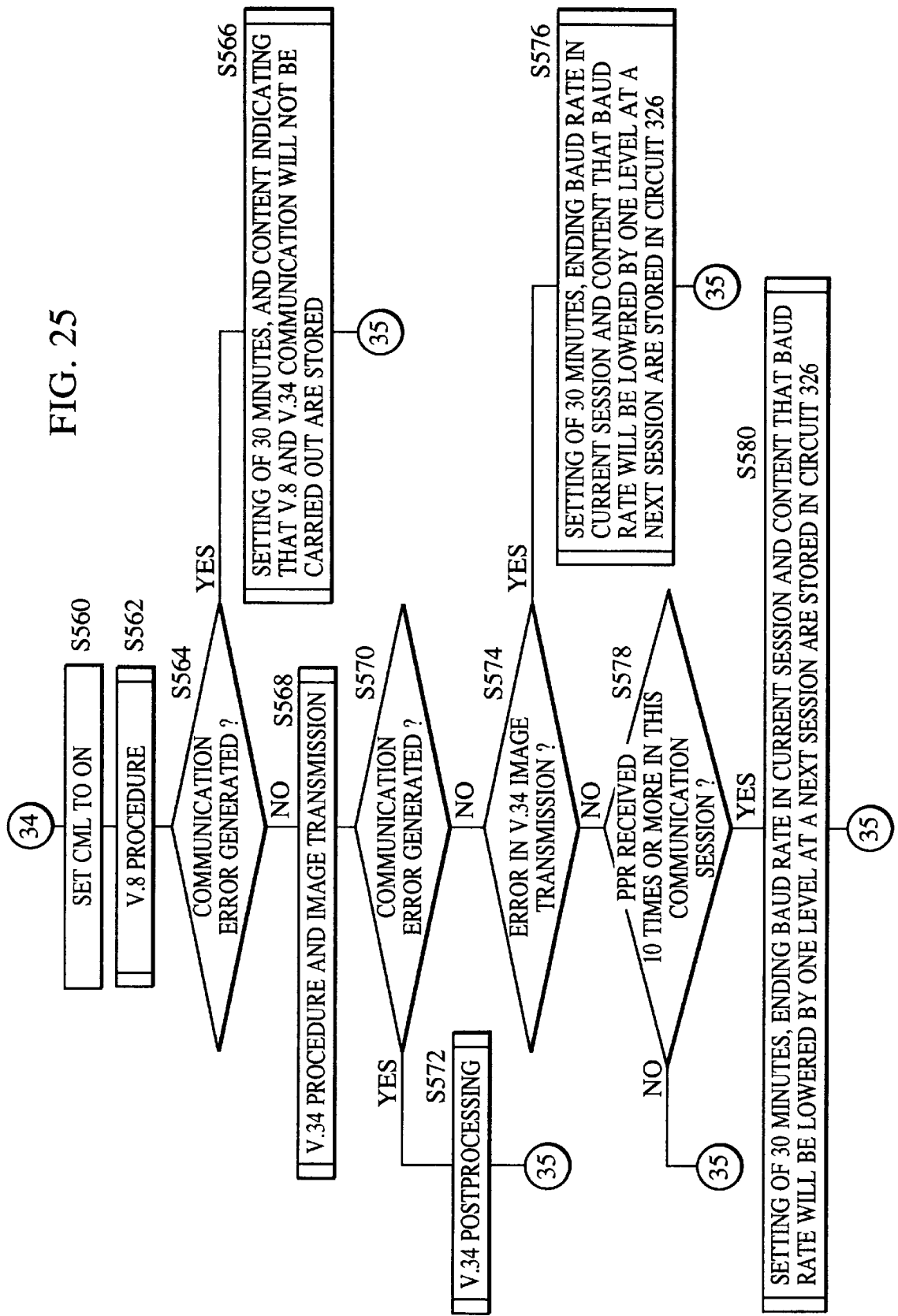
FIG. 25 is a flow diagram of the operation of the sixth embodiment.

FIGS. 23 through 25 are flow diagrams showing the control flow in the operation of the control circuit 320 according to the sixth embodiment. In the sixth embodiment, the memory circuit 328 is not used.

The operation starts at step S530. At step S532, all memory in the memory circuit 326 is cleared via the signal line 326a. At step S534, all memory in the memory circuit 328 is cleared via the signal line 328a.

A 0-level signal is output over the signal line 320a, setting a CML to off at step S536. A 0-level signal output is output over the signal line 320d, inhibiting the ANSam signal from being output at step S538.

At step S540, the control circuit 320 receives the signal via the signal line 322a to determine whether a call signal is detected. With no call signal detected, the sequence goes to step S542 to perform other processes.

When a call signal is detected, the sequence goes to step S544. The control circuit 320 receives the signal via the signal line 324a to determine whether telephone number information detected between call signals is stored in the memory circuit 326. When the telephone number information is stored there, the sequence goes to step S546. With no telephone number information stored, the sequence goes to step S560.

The transmission mode associated with the just detected telephone number between the call signals and stored in the memory circuit 326 is checked at step S546. When the V. 8 and V. 34 communication is not performed, the sequence goes to step S548. When the V. 8 and V. 34 communication is performed but with the baud rate limited, the sequence goes to step S556. When the V. 8 and V. 34 communication is performed but with the bit rate limited, the sequence goes to step S558.

A 1-level signal is output over the signal line 320a, setting the CML to on at step S548. The V. 21 procedure is performed at step S550, where the FIF (facsimile information field) of a DIS (digital identification signal) signal declares that V. 8 function is not provided.

The V. 27 ter, V. 29 and V. 17 image transmission is performed at step S552, and the postprocessing in the V. 21 procedure is performed at step S554. The sequence goes to step S536.

At step S556, the apparatus is set such that the subsequent communication is performed at a baud rate that is one level lower than the baud rate immediately prior to the erratic communication, and stored in the memory circuit 326 in connection with the telephone number between the call signals detected. The sequence goes to step S560.

At step S558, the apparatus is set such that the subsequent communication is performed at a bit rate that is one level lower than the bit rate immediately prior to the erratic communication, and stored in the memory circuit 326 in connection with the telephone number between the call signals detected. The sequence goes to step S560.

A 1-level signal is output over the signal line 320a, setting the CML to on at step S560. The V. 8 procedure is performed at step S562. At step S564, a determination is made of whether a communication error occurred. When an error is detected, the sequence goes to step S566. When no error is detected, the sequence goes to step S568.

At step S566, the memory circuit 326 stores, via the signal line 326a, a predetermined time of 30 minutes and a content that the V. 8 and V. 34 communication will not be carried out, in connection with the telephone number just detected. The sequence goes to step S536.

The V. 34 procedure and V. 34 image transmission are performed at step S568. At step S570, a determination is made of whether a communication error occurred. When no error is detected, the sequence goes to step S572, where the postprocessing in the V. 34 procedure is performed. The sequence then goes to step S536.

When an error is detected, the sequence goes to step S574 to determine whether the error is an error during reception in the V. 34 image transmission. When the error is an error during reception in the V. 34 image transmission, the sequence goes to step S576. When the error is not an error during reception, the sequence goes to step S578.

At step S576, in connection with the just detected telephone number, the memory circuit 326 stores, via the signal line 326a, a setting of predetermined time of 30 minutes, the ending baud rate of the current communication, and the content that a baud rate that is one level lower than the current baud rate will be used.

At step S578, a determination is made of whether a PPR signal is transmitted 10 times or more. When the PPR signal is transmitted 10 times or more, the sequence goes to step S580. Whe the PPR signal is transmitted less than 10 times, the sequence goes to step S536.

At step S580, in connection with the just detected telephone number, the memory circuit 326 stores, via the signal line 326a, a setting of predetermined time of 30 minutes, the ending bit rate of the current communication, and the content that a bit rate that is one level lower than the current bit rate will be used. Then, the sequence goes to step S536.

Figure 26:
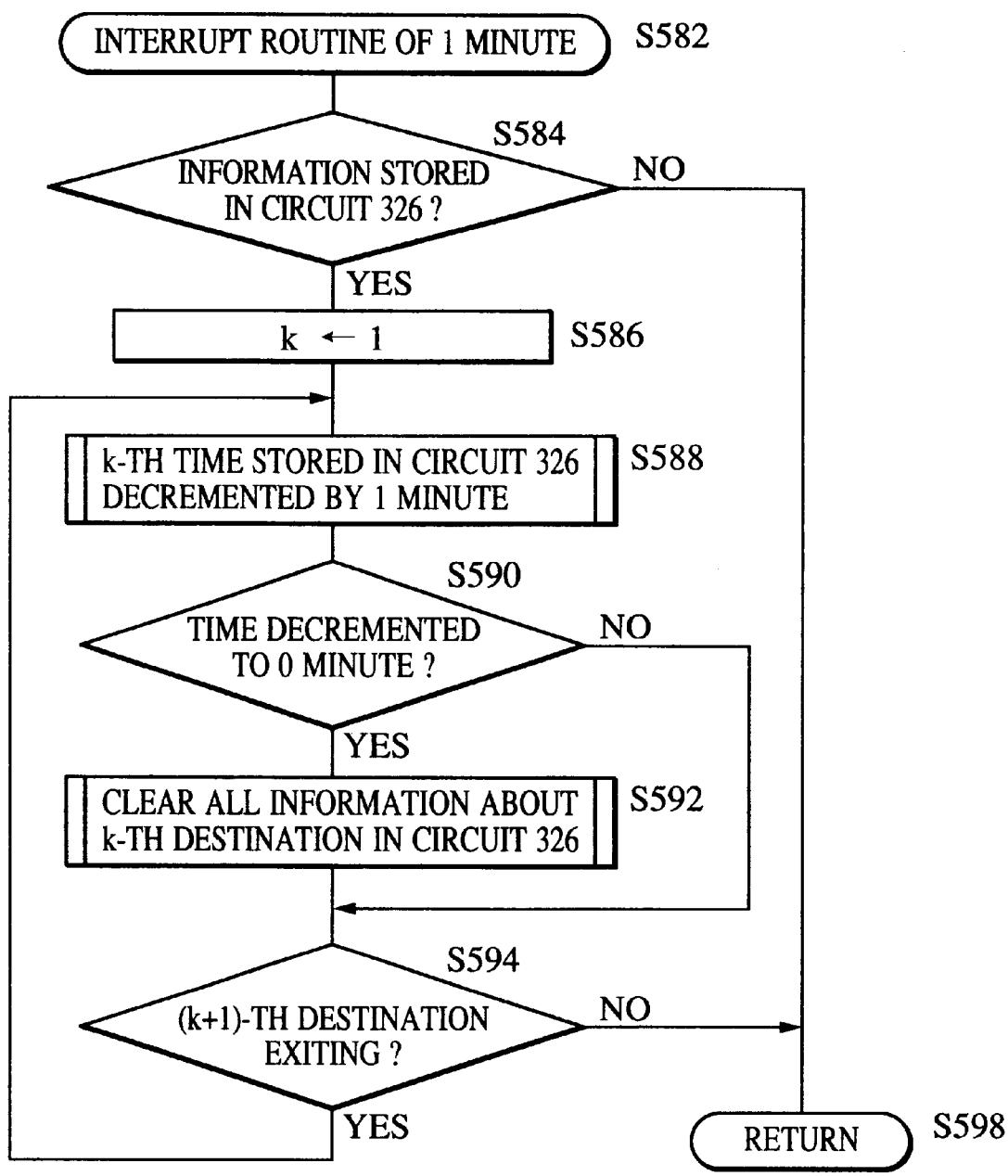
FIG. 26 is a flow diagram of the operation of the sixth embodiment.
Figure 27:
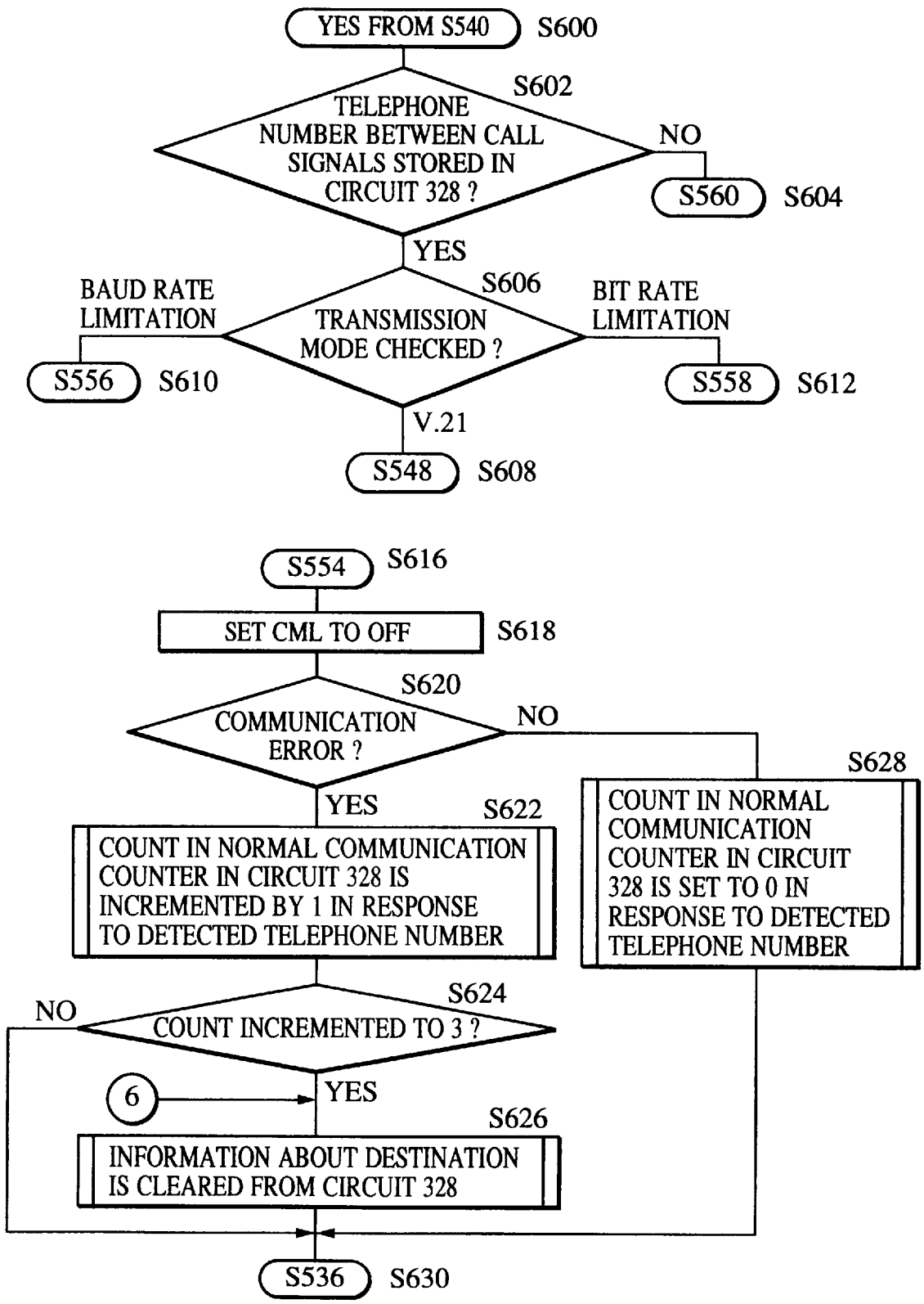
FIG. 27 is a flow diagram of the operation of the seventh embodiment.

FIG. 26 shows an interrupt routine, and steps from S582 thereafter are executed every minute.

At step S584, the control circuit 320 determines via the signal line 326a whether telephone number information is stored in the in memory circuit 326. When it is not stored there, the sequence goes to step S598 to return from this routine.

When it is stored there, the sequence goes to step S586, where a counter k is set to 1. At step S588, the stored time is decremented by 1 minute in connection with the k-th telephone number information stored in the memory circuit 326 via the signal line 326a, and then the decremented time is stored back in the memory circuit 326. At step S590, a determination is made of whether the decremented time is 0 minute. When it is not 0 minute, the sequence goes to step S594. When it reaches 0 minute, the sequence goes to step S592, where all information related to the k-th destination is cleared via the signal line 326a. The sequence then goes to step S594.

At step S594, a determination is made of whether the memory circuit 326 stores a (k+1)-th destination. When no destination is stored there, the sequence goes to step S598 to return from this routine. When the (k+1)-th destination is stored there, the sequence goes to step S596, where the count of the counter k is incremented by 1. The sequence goes to step S588.

The seventh embodiment of the present invention is now discussed.

According to the seventh embodiment, the results of the V. 8 and V. 34 communication are stored according each piece of telephone number information between call signals, and referring to the stored information, subsequent communications are performed in response to a call from the same destination, based on one of the following transmission modes: one using the V.8 and V. 34 procedures without any limitation, one not using the V. 8 and V. 34 procedure, one performing V. 8 and V. 34 procedures but with its baud rate limited, and one performing V. 8 and V. 34 procedures but with its bit rate limited. The limited baud rate and limited bit rate are the ones that are one level lower than the baud rate and bit rate, respectively, immediately prior to the error, and when no communication error takes place for a predetermined count of communication sessions or times under a predetermined condition, the level of limitation is relaxed by one level.

FIGS. 27 through 30 are flow diagrams of the portion of the control according to the seventh embodiment, which is different from the six embodiment.

19

The seventh embodiment uses the memory circuit 328 rather than the memory circuit 326. The interrupt routine of 1 minute in FIG. 26 is not used either in this embodiment.

Step S600 corresponds to "yes" at step S540. The control circuit 320 receives the signal via the signal line 324a to determine whether telephone number detected between call signals is stored in the memory circuit 328. When the telephone number information is stored there, the sequence goes to step S606. With no telephone number information stored, the sequence goes to step S604 (S560).

The transmission mode associated with the just detected telephone number between the call signals and stored in the memory circuit 328 is checked at step S606. When the V. 8 and V. 34 communication is not performed, the sequence goes to step S608 (S548). When the V. 8 and V. 34 communication is performed but with the baud rate limited, the sequence goes to step S610 (S556). When the V. 8 and V. 34 communication is performed but with the bit rate limited, the sequence goes to step S612 (S558).

At steps S614, S615, process is based on the information stored in the memory circuit 328, different from above-described steps S556, S558 where process is based on the information stored in the memory circuit 326.

Step S616 corresponds to step S554. At step S618, a 0-level signal is output over the signal line 320a, setting the CML to off.

At step 620, a determination is made of whether a communication error occurred in the V. 21, V. 27 ter, V. 29, and V. 17 communication. When no error is detected, the sequence goes to step S622, where the count at a normal communication counter in the memory circuit 328 is incremented by 1 in connection with the telephone number detected, and then the sequence goes to step S624. When an error is detected, the sequence goes to step S628, where the count at the normal communication counter in the memory circuit 328 is set to 0 in connection with the telephone number detected, and the sequence goes to step S630 (S536).

At step S624, a determination is made of whether the count incremented at step S622 is 3. When the incremented count is not 3, the sequence goes to step S630 (S536). When the incremented count is 3, the sequence goes to step S626, where the destination and its associated information are cleared from the memory circuit 328. The sequence goes to step S630 (S536).

Step S632 corresponds to "yes" at step S564. At step S634, the memory circuit 328 stores via the signal line 328a a content that the V. 8 and V. 34 communication will not be used in connection with the just detected telephone number and the normal communication counter is set to 0. At step S636, the sequence goes to step S536.

Step S638 corresponds to "yes" at step S574. At step S640, the memory circuit 328 stores, via the signal line 328a, the ending baud rate of the current communication and the content that a next baud rate is lowered by one level from the ending baud rate of the current communication in connection with the just detected telephone number, and the normal communication counter is set to 0. The sequence goes to step S636 (S536).

Step S642 corresponds to "yes" at step S578. At step S644, the memory circuit 328 stores, via the signal line 328a, the ending bit rate of the current communication and the content that a next bit rate is lowered by one level from the ending bit rate of the current communication in connection with the just detected telephone number, and the normal communication counter is set to 0. The sequence goes to step S636 (S536).

20

Step S646 corresponds to "no" at step S578. At step S648, the normal communication counter in the memory circuit 328 is set to 0 via the signal line 328a in connection with the just detected telephone number. At step 650, the sequence goes to step S536.

Step S652 means the previous S572. At step S654, a 0-level signal is output over the signal line 320a, setting the CML to off.

The count at the normal counter in the memory circuit 328 is incremented by 1 in connection with the just detected telephone number via the signal line 328a and is then stored there at step S656. At step S658, a determination is made of whether the incremented count is 3. When it is not 3, the sequence goes to step 650.

When the incremented count reaches 3, the sequence goes to step S660 to determine whether the limitation in use is applied to the baud rate or the bit rate. When the baud rate is limited, the sequence goes to step S662. When the bit rate is limited, the sequence goes to step S666.

At step S662, the limitation in the baud rate stored in the memory circuit 328 in connection with the just detected telephone number is relaxed by one level via the signal line 328a, and the count at the normal communication counter is set to 0.

At step S664, a determination is made of whether the baud rate of which limitation was relaxed by one level becomes equal to the baud rate that has no limitation at all. When both baud rates are equal, the sequence goes to step S626. When both baud rates are not equal, the sequence goes to step S650 (S536).

At step S666, the limitation in the bit rate stored in the memory circuit 328 in connection with the just detected telephone number is relaxed by one level via the signal line 328a, and the count at the normal communication counter is set to 0.

At step S668, a determination is made of whether the bit rate of which limitation was relaxed by one level becomes equal to the bit rate that has no limitation at all. When both bit rates are equal, the sequence goes to step S626. When both bit rates are not equal, the sequence goes to step S650 (S536).

An eighth embodiment of the present invention is now discussed.

The V. 8 and V. 34 communication, if performed over an excessively noisy line, will consume more time than the V. 21, V. 27 ter, V. 29 and V. 17 communication, and the reliability of the V. 8 and V. 34 communication will be degraded. In the eighth embodiment, noise on the line is detected. When a noise level is too high, the transmission mode is shifted to the V. 21, V. 27 ter, V. 29 and V. 17 communication to achieve a communication time shorter than that required in the V. 8 and V. 34 communication and to heighten a communication reliability.

Figure 31:
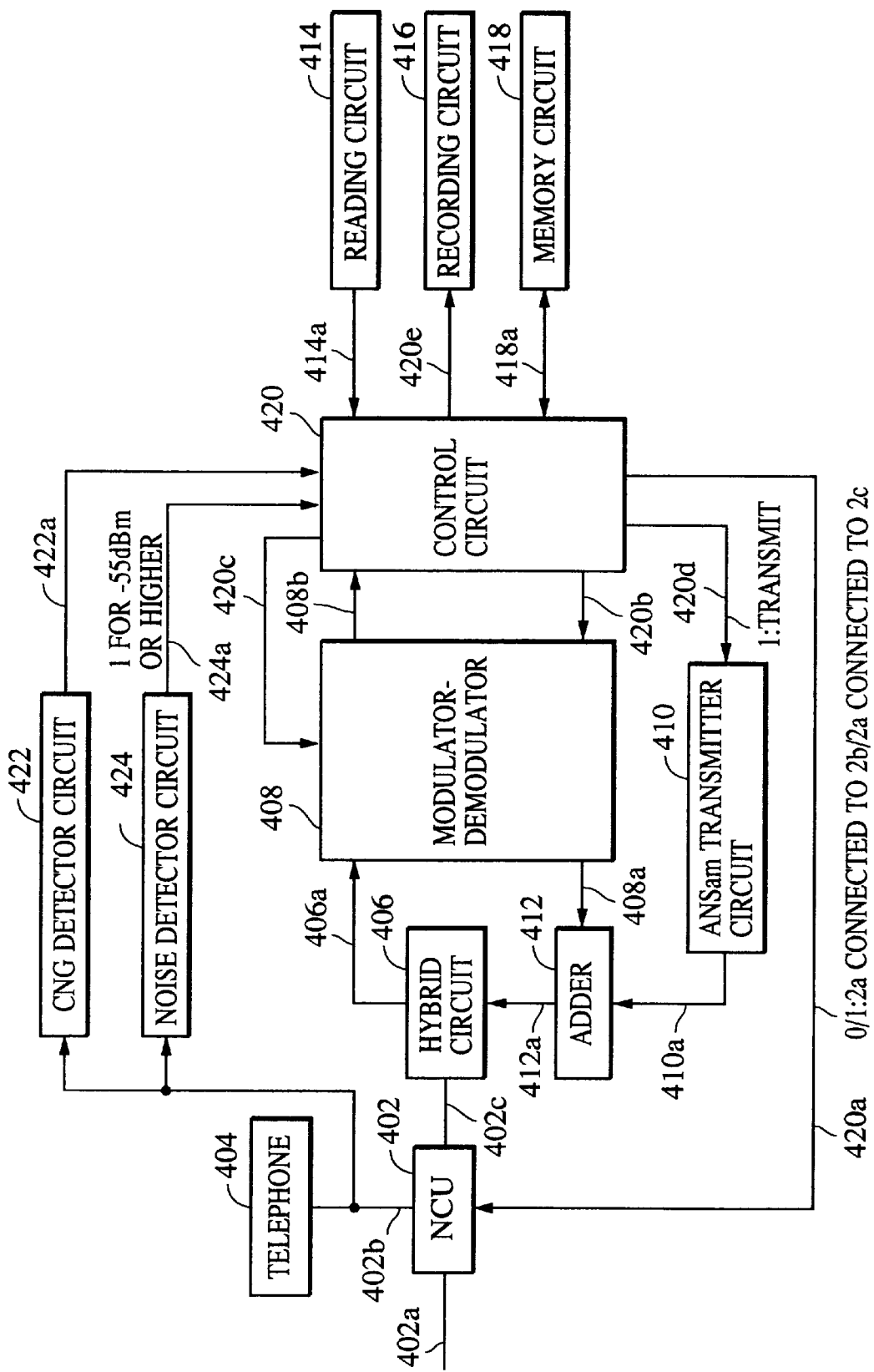
FIG. 31 is a block diagram of an eighth embodiment of the present invention.

FIG. 31 is a block diagram showing a facsimile apparatus in which the eighth embodiment is incorporated.

NCU402 connected to the line of a telephone grid controls connection with the telephone grid, switches to data communications line, and retains a loop to use the telephone grid for data communications. NCU402 connects a telephone line 402a to a telephone 404 when a control circuit 420 gives a 0-level signal (on a signal line 420a), and connects the telephone line 402a to the facsimile apparatus when a 1-level signal is given. In normal operation status, the telephone line 402a remains connected to the telephone 404.

A hybrid circuit 406 isolates transmitted signals from received signals, supplies transmitted signals from an adder 412 to the telephone line 402a via NCU402, receives signals from other lined stations via NCU402 and sends the received signal to a modulator-demodulator 408 via signal line 406a.

The modulator-demodulator 408 performs modulation and demodulation based on ITU-T Recommendations V. 8, V. 21, V. 27 ter, V. 29, V. 17, and V. 34, and is instructed to perform the respective transmission modes via a signal line 420c. The modulator-demodulator 408 outputs modulated data over a signal line 408a while receiving a signal output over a signal line 420b, and outputs demodulated data over a signal line 408b while receiving a signal output over a signal line 406a.

An ANSam circuit 410 outputs an ANSam signal. The ANSam circuit 410 outputs the ANSam signal to a signal line 410a when a 1-level signal is output over a signal line 420d, and outputs no signal over the signal line 410a when a 0-level signal is output over the signal line 420d.

An adder 412 receives information from signal lines 408a and 410a, and outputs an added result over a signal line 412a. A reading circuit 414 reads an image of an original document, and outputs read image data over a signal line 414a. A recording circuit 416 records information output over a line 420e, sequentially one line by one line.

A memory circuit 418 stores unprocessed read information, coded information, received information and decoded information.

When a CNG signal detector circuit 422 detects a CNG signal (a 1100 Hz tonal signal) in the information coming in via a signal line 402b, the CNG signal detector circuit 422 outputs a 1-level signal over a signal line 422a. When the circuit 422 detects no CNG signal, it outputs a 0-level signal over the signal line 422a.

A noise detector circuit 424 detects noise on the line. When it detects a signal of −55 dBm or greater in the information coming in via the signal line 402b, the detector circuit 424 outputs a 1-level signal over a signal line 424a. When the detected signal is smaller than −55 dBm, the detector circuit 424 outputs a 0-level signal over the signal line 424a.

In this embodiment, the control circuit 420 selects between the V. 8 and V. 34 communication and the V. 21, V. 27 ter, V. 29 and V. 17 communication, based on the noise level on the connected line when a call is processed.

Figure 32:
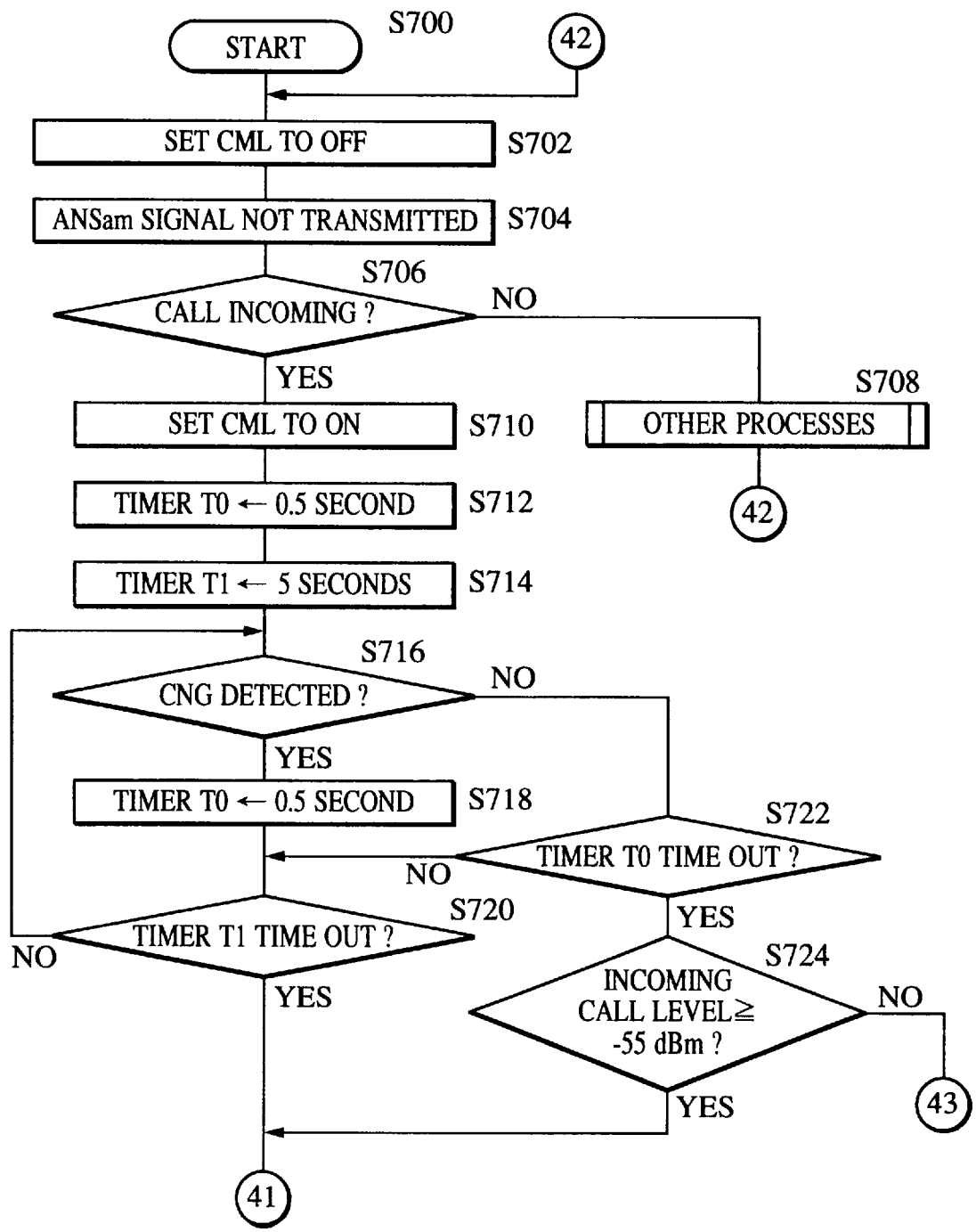
FIG. 32 is a flow diagram of the operation of the eighth embodiment.
Figure 33:
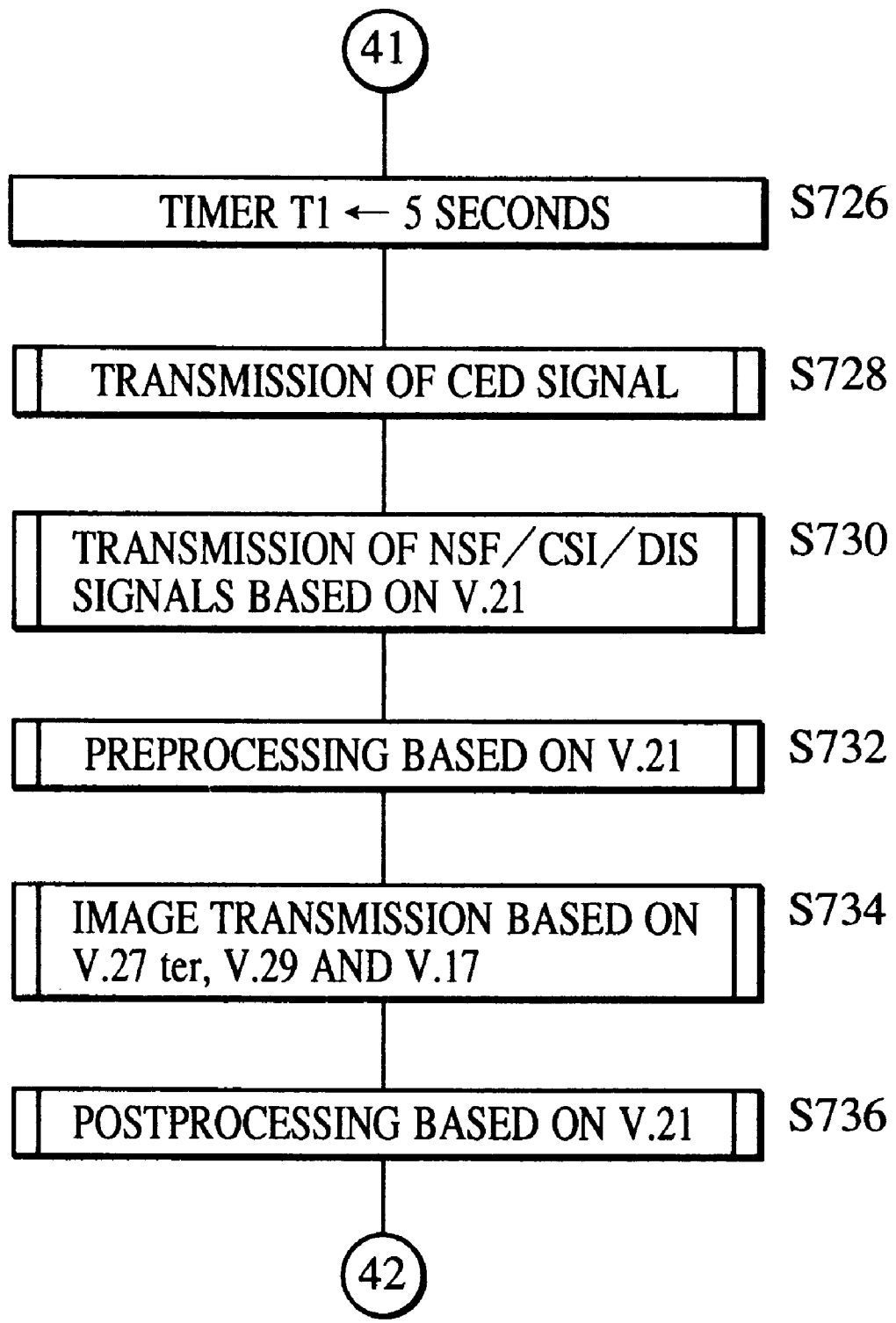
FIG. 33 is a flow diagram of the operation of the eighth embodiment.
Figure 34:
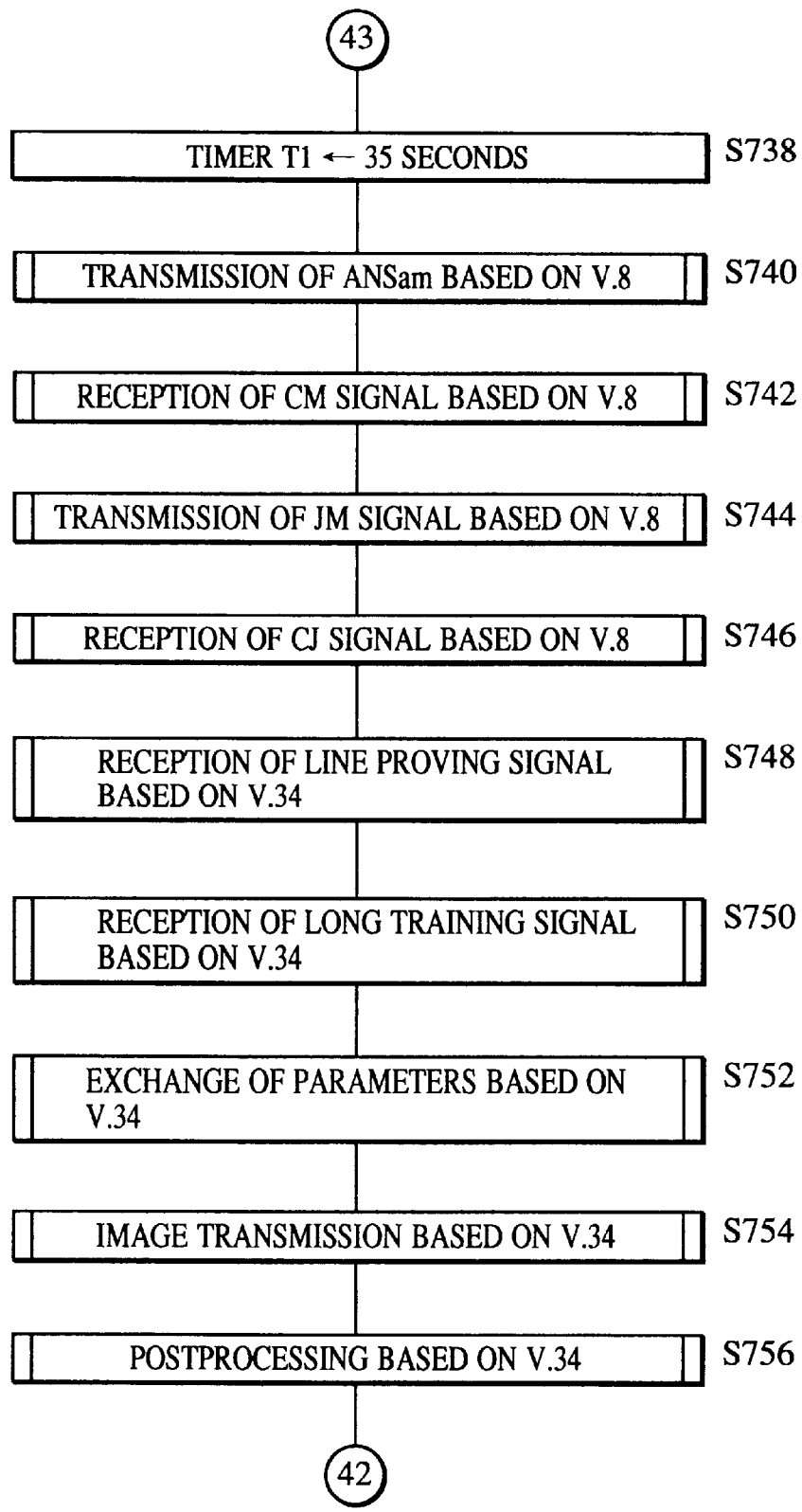
FIG. 34 is a flow diagram of the operation of the eighth embodiment.

FIGS. 32 through 34 are flow diagrams of the control flow in the operation of the control circuit 420 according to the eighth embodiment.

The operation starts at step S700. A 0-level signal is output over the signal line 420a, setting the CML to off at step S702. At step S704, a 0-level signal is output over the signal line 420d, inhibiting the ANSam signal from being transmitted.

At step S706, a determination is made of whether a call is detected. When a call is detected, the sequence goes to step S710. When no call is detected, the sequence goes to step S708 to perform other processed.

A 1-level signal is output over the signal line 420a, setting the CML to on at step S710. At step S712, a timer T0 is set to 0.5 second. At step S714, a timer T1 is set to 5 seconds.

At step S716, the control circuit 420 receives information via the signal line 422a to determine whether the CNG signal, namely, the 1100 Hz tonal signal is detected. When the CNG signal is detected, the sequence goes to step S718 to set the timer T0 to 0.5 second. At step S720, a determination is made of whether the timer T1 has timed out. When the timer T1 has timed out, the sequence goes to step S726 for the execution of the V. 21, V. 27 ter, V. 29 and V. 17 communication. When the timer T1 has not timed out yet, the sequence goes to step S716 to detect the CNG signal.

When the CNG signal is not detected at step S716, the sequence goes to step S722 to determine whether the timer T0 has timed out. When the timer T0 has not timed out, the sequence goes to step S720. When the timer T0 has timed out, the sequence goes to step 724.

At step S724, the control circuit 420 receives information via the signal line 424a to determine whether noise of −55 dBm or greater exists. When such noise exists, the sequence goes to step S726 to execute the V. 21, V. 27 ter, V. 29 and V. 17 communication. When no such noise exists, the sequence goes to step S738 to execute the V. 8 and V. 34 communication.

The initial identification timer T1 is set to 35 seconds at step S726, and a CED (called station identification) signal is transmitted at step S728. At step S730, NSF (non-standard facilities)/CSI (called subscriber identification)/DIS (digital identification signal) signals based on the V. 21 are transmitted. The preprocessing in the V. 21 procedure is performed at step S732. At step S734, image transmission is performed based on V. 27 ter, V. 29 and V. 17 procedures. At step S736, the postprocessing in the V. 21 procedure is performed. The sequence returns to step S702.

At step S738, the initial identification timer T1 is set to 35 seconds. The ANSam signal is transmitted based on the V. 8 at step S740. At step S742, a V. 8 CM signal is received. A V. 8 JM signal is transmitted at step S744. A V. 8 CJ signal is received at step S746. A V. 34 line proving signal is received at step S748.

A V. 34 long training signal is received at step S750. Parameters are exchanged based on the V. 34 procedure at step S752. Image transmission is performed based on the V. 34 procedure at step S754. The postprocessing in the V. 34 procedure is performed at step S756. The sequence goes back to step S702.

When the noise level is high on the line, the CED signal and the V. 21 NSF/CSI/DIS signals are transmitted immediately in succession to an incoming call, namely, the transmission mode is immediately shifted to the V. 21, V. 27 ter, V. 29 and V. 17 communication. The communication time is thus shortened compared with the V. 8 and V. 34 communication, and the reliability of communication is thus heightened.

As described above, according to each of the above embodiments, an error is examined on a destination by destination basis when the error occurs in the V. 8 and V. 34 communication, and based on the results of examination, a retransmission is performed in a proper transmission mode.

A proper transmission mode is selected based on a communication history in connection with any particular destination in the V. 8 and V. 34 communication, and thus a reliable communication is achieved.

Referring to a telephone number between call signals, the telephone number information of a calling station is effectively taken advantage of, prior to a call connection.

When an error occurs in the V. 34 communication with a destination station, the communication of V. 21, V. 27 ter, V. 29 and V. 17 is performed to receive from the same station, namely a half-duplex communication is performed. This lowers the probability of communication error occurrence and heightens the reliability of communication. Although the transfer rate is slow, a single communication session is completed in a shorter time.

When an error occurs in the full-duplex V. 8 and V. 34 communication, a retransmission is performed based on the V. 21 procedure so that a half-duplex communication is reliably carried out. Thus, a further retransmission is precluded.

When an error occurs in the V. 8 procedure, V. 34 procedure, and V. 34 image transmission, a user can set a predetermined time during which the V. 21 procedure is performed, in response to calls thereafter from the occurrence of the error. The user is thus allowed to select between a reliable communication and a fast communication in the facsimile apparatus.

The user can activate a manual reception, and rarely uses an automatic redialing in this case. Thus, the user can communicate in a usable transmission mode of his own choice.

When an error occurs in the middle of the V. 8 and V. 34 communication performed in response to a call from a destination, a proper transmission mode is set in response to subsequent transmission from the same destination, in consideration of the error. An efficient and reliable communication is thus allowed.

Based on a telephone number between call signals, the baud rate and bit rate in the V. 8 and V. 34 communication is finely controlled on a destination by destination basis. Communication is thus efficiently performed in a proper transmission mode.

When the noise level on a line is high, the transmission mode can be shifted to the V. 21, V. 27 ter, V. 29 and V. 17 communication. Compared with the V. 8 and V. 34 communication, the communication time is short and the reliability of communication is high.

The present invention is not restricted to the above-described embodiments, but allows various modifications without departing from the scope of the appended claims.

What is claimed is:

1. A facsimile apparatus complying with ITU-T Recommendations V.8 and V.34 for V.8 and V.34 communication, said apparatus comprising:
communicating means for performing an initial communication of data with a destination, the initial communication being a V.8 and V.34 communication; and
error detecting means for detecting whether or not an error occurs in connection with the initial communication and, if an error occurs, what type of error occurs,
wherein, in response to said error detecting means detecting an error of one of three types occurring in the initial communication, said communicating means performs a second communication of the data with the destination in accordance with a detected type of the error, such that:
(a) when the error is a first type where the initial communication ended in error, said communication means performs the second communication in a mode not performing V.8 and V.34 communication,
(b) when the error is a second type wherein the error occurs during V.34 communication of the initial communication, said communication means performs the second communication in a mode performing V.8 and V.34 communication but with a baud rate limited, and
(c) when the error is a third type wherein the error comprises reception of PPR at least a predetermined number of times during the initial communication, said communication means performs the second communication in a mode performing V.8 and V.34 communication but with a bit rate limited.

2. An apparatus according to claim 1, wherein when said error detecting means detects an error other than one of the first, second and third types of error in the initial communication, said communicating means performs the second communication in a mode performing V.8 and V.34 communication without limitation.

3. A facsimile apparatus complying with ITU-T Recommendations V.8 and V.34 for V.8 and V.34 communication, said apparatus comprising:
memory means for storing a communication history of communication with a destination, the communication history indicating, for at least one prior communication with the destination, whether an error occurred in the prior communication and, if an error occurred, what type of error occurred,
communicating means for performing a current communication of data with the destination; and
error detecting means for detecting whether or not an error occurs in connection with the current communication and, if an error occurs, what type of error occurs,
wherein, in response to said error detecting means detecting an error occurring in the current communication, said memory stores the detected error and the detected type of the detected error in said memory means as part of the communication history, and
wherein said communicating means is operative in accordance with the communication history such that:
(a) when the communication history indicates a first type of error in which the prior communication ended in error, said communicating means performs the current communication in a mode not performing V.8 and V.34 communication,
(b) when the communication history indicates a second type of error in which the prior communication had an error occurring during V.34 communication, said communicating means performs the current communication in a mode performing V.8 and V.34 communication but with a baud rate limited,
(c) when the communication history indicates a third type of error in which PPR was received at least a predetermined number of times during the prior communication, said communicating means performs the current communication in a mode performing V.8 and V.34 communication but with a bit rate limited, and
(d) when the communication history indicates that none of the first, second and third types of errors occurred in the prior communication, said communicating means performs the current communication in a mode performing V.8 and V.34 communication without limitation.

4. An apparatus according to claim 3, wherein the communication history indicates, for each of a plurality of prior communications, whether an error occurred and, if an error occurred, what type of error occurred, and said communicating means performs the current communication in accordance with indicated errors in each of the plurality of prior communications.

5. An apparatus according to claim 4, wherein, when three successive communications are performed by said communicating means without the occurrence of any of the first, second or third types of errors, said apparatus resets the communication history to indicate no errors in any prior communication.

6. A facsimile method complying with ITU-T Recommendations V.8 and V.34 for V.8 and V.34 communication, said method comprising the steps of:

communicating to perform an initial communication of data with a destination, the initial communication being a V.8 and V.34 communication; and detecting whether or not an error occurs in connection with the initial communication and, if an error occurs, what type of error occurs, wherein, in response to said error detecting step detecting an error of one of three types occurring in the initial communication, said communicating step performs a second communication of the data with the destination in accordance with a detected type of the error, such that:
  (a) when the error is a first type where the initial communication ended in error, said communicating step performs the second communication in a mode not performing V.8 and V.34 communication,
  (b) when the error is a second type wherein the error occurs during V.34 communication of the initial communication, said communicating step performs the second communication in a mode performing V.8 and V.34 communication but with a baud rate limited, and
  (c) when the error is a third type wherein the error comprises reception of PPR at least a predetermined number of times during the initial communication, said communicating means performs the second communication in a mode performing V.8 and V.34 communication but with a bit rate limited.

7. A method according to claim 6, wherein when said error detecting step detects an error other than one of the first, second and third types of error in the initial communication, said communicating step performs the second communication in a mode performing V.8 and V.34 communication without limitation.

8. A facsimile method complying with ITU-T Recommendations V.8 and V.34 for V.8 and V.34 communication, said method comprising the steps of:

storing a communication history of communication with a destination, the communication history indicating, for at least one prior communication with the destination, whether an error occurred in the prior communication and, if an error occurred, what type of error occurred, communicating by performing a current communication of data with the destination; and detecting whether or not an error occurs in connection with the current communication and, if an error occurs, what type of error occurs, wherein, in response to said error detecting step detecting an error occurring in the current communication, said storing step stores the detected error and the detected type of the detected error as part of the communication history, and wherein said communicating step is operative in accordance with the communication history such that:
  (a) when the communication history indicates a first type of error in which the prior communication ended in error, said communicating step performs the current communication in a mode not performing V.8 and V.34 communication,
  (b) when the communication history indicates a second type of error in which the prior communication had an error occurring during V.34 communication, said communicating step performs the current communication in a mode performing V.8 and V.34 communication but with a baud rate limited,
  (c) when the communication history indicates a third type of error in which PPR was received at least a predetermined number of times during the prior communication, said communicating step performs the current communication in a mode performing V.8 and V.34 communication but with a bit rate limited, and
  (d) when the communication history indicates that none of the first, second and third types of errors occurred in the prior communication, said communicating step performs the current communication in a mode performing V.8 and V.34 communication without limitation.

9. A method according to claim 8, wherein the communication history indicates, for each of a plurality of prior communications, whether an error occurred and, if an error occurred, what type of error occurred, and said communicating step performs the current communication in accordance with indicated errors in each of the plurality of prior communications.

10. A method according to claim 9, wherein, when three successive communications are performed by said communicating means without the occurrence of any of the first, second or third types of errors, said apparatus resets the communication history to indicate no errors in any prior communication.

* * * * *

UNITED STATES PATENT AND TRADEMARK OFFICE
CERTIFICATE OF CORRECTION

PATENT NO. : 6,091,807

DATED : July 18, 2000

INVENTOR(S) : TAKEHIRO YOSHIDA

It is certified that error appears in the above-identified patent and that said Letters Patent is hereby corrected as shown below:

```
     On the title page:
```

[56] REFERENCES CITED

```
  Other Publications:
  "dation V.8, Sep. 1994." should read --dation V.8,
     Sep. 1994. ¶ Data Communication Over the Telephone
     Network, A Modem Operating At Data--; and
  "Point-To Point 2-Wire Telephone-Type Circuits,"
     should read --Point-To-Point 2-Wire Telephone-Type
     Circuits,--.
```

SHEET 3

```
  Figure 3, "BASED V.8" should read --BASED ON V.8--.
```

SHEET 6

Figure 6:
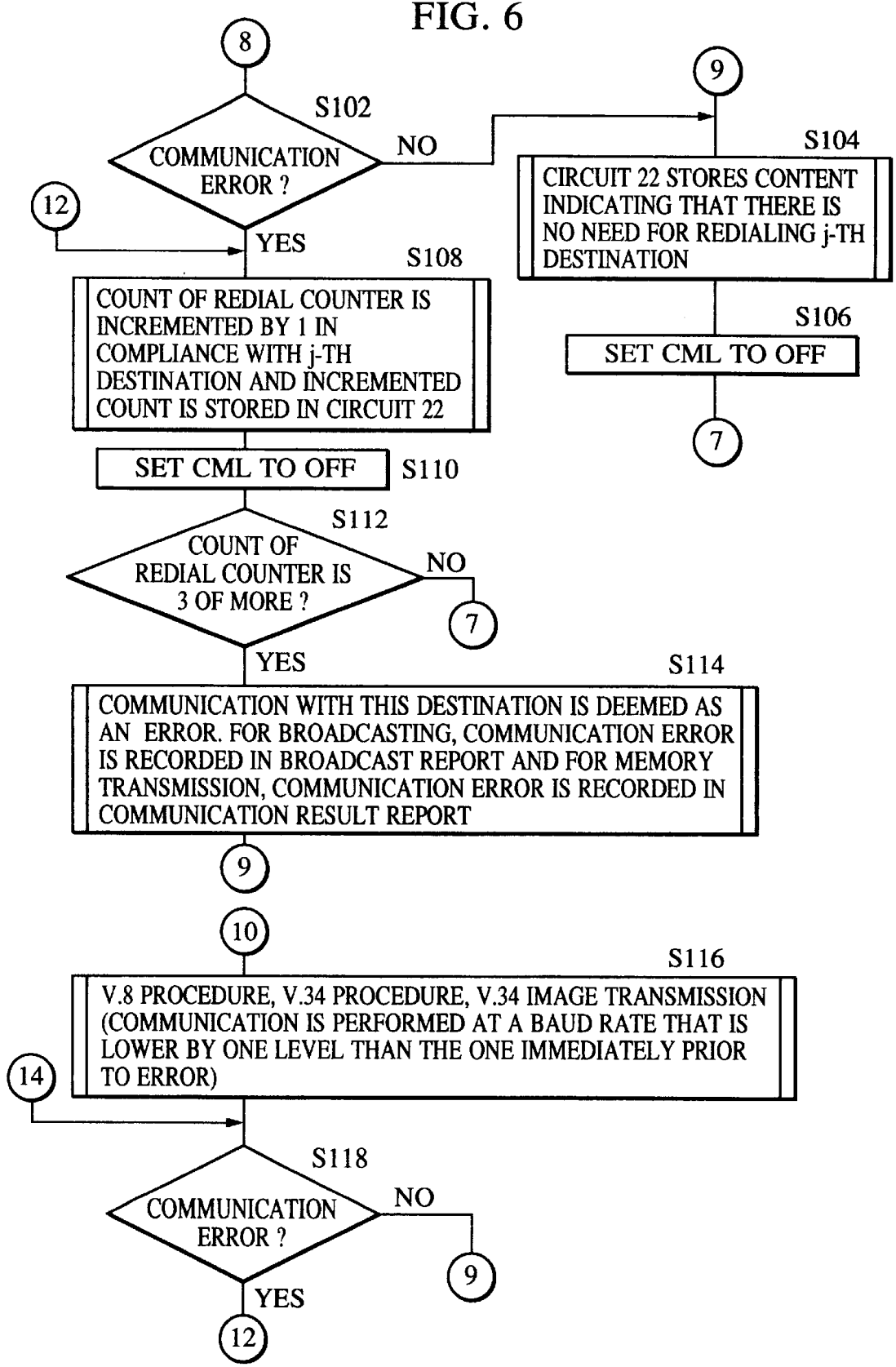
FIG. 6 is a flow diagram of the operation of the first embodiment.
Figure 7:
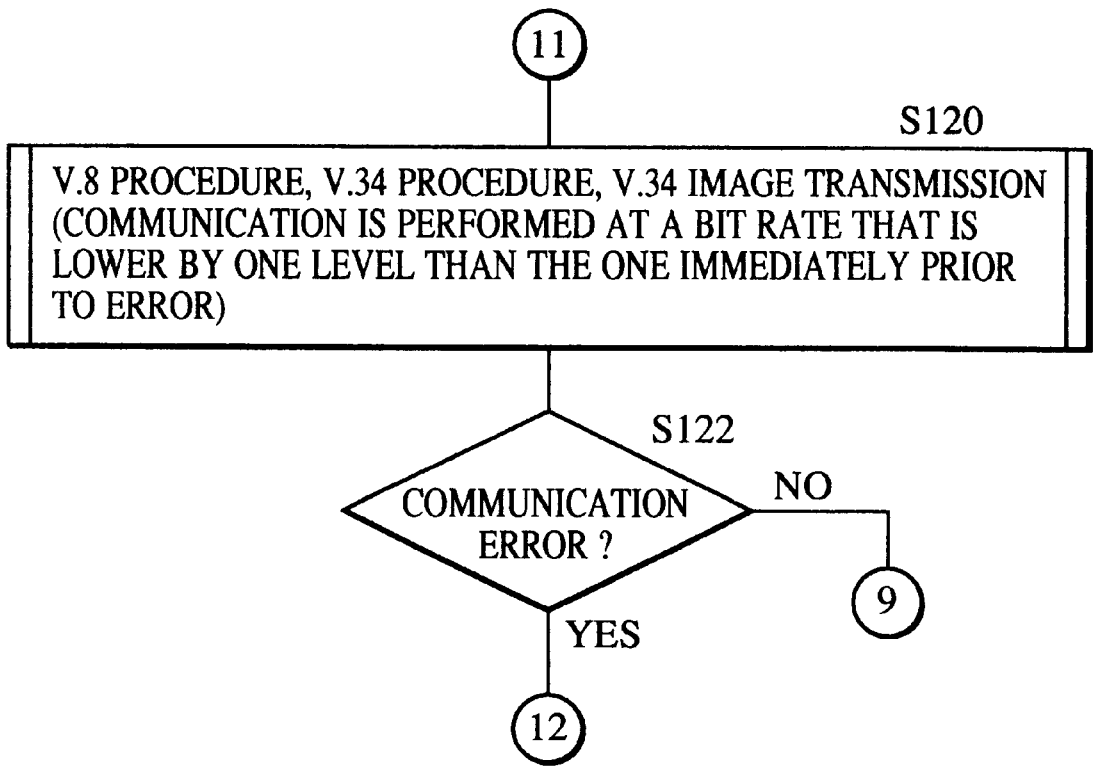
FIG. 7 is a flow diagram of the operation of the first embodiment.

```
  Figure 6, "3 OF MORE" should read --3 OR MORE--.
```

SHEET 7

```
  Figure 9, "COMSIDERED" should read --CONSIDERED--.
```

UNITED STATES PATENT AND TRADEMARK OFFICE
CERTIFICATE OF CORRECTION

PATENT NO. : 6,091,807

DATED : July 18, 2000

INVENTOR(S) : TAKEHIRO YOSHIDA

It is certified that error appears in the above-identified patent and that said Letters Patent is hereby corrected as shown below:

SHEET 13

Figure 14, "TELEPHONE THIS" should be deleted.

SHEET 27

Figure 28:
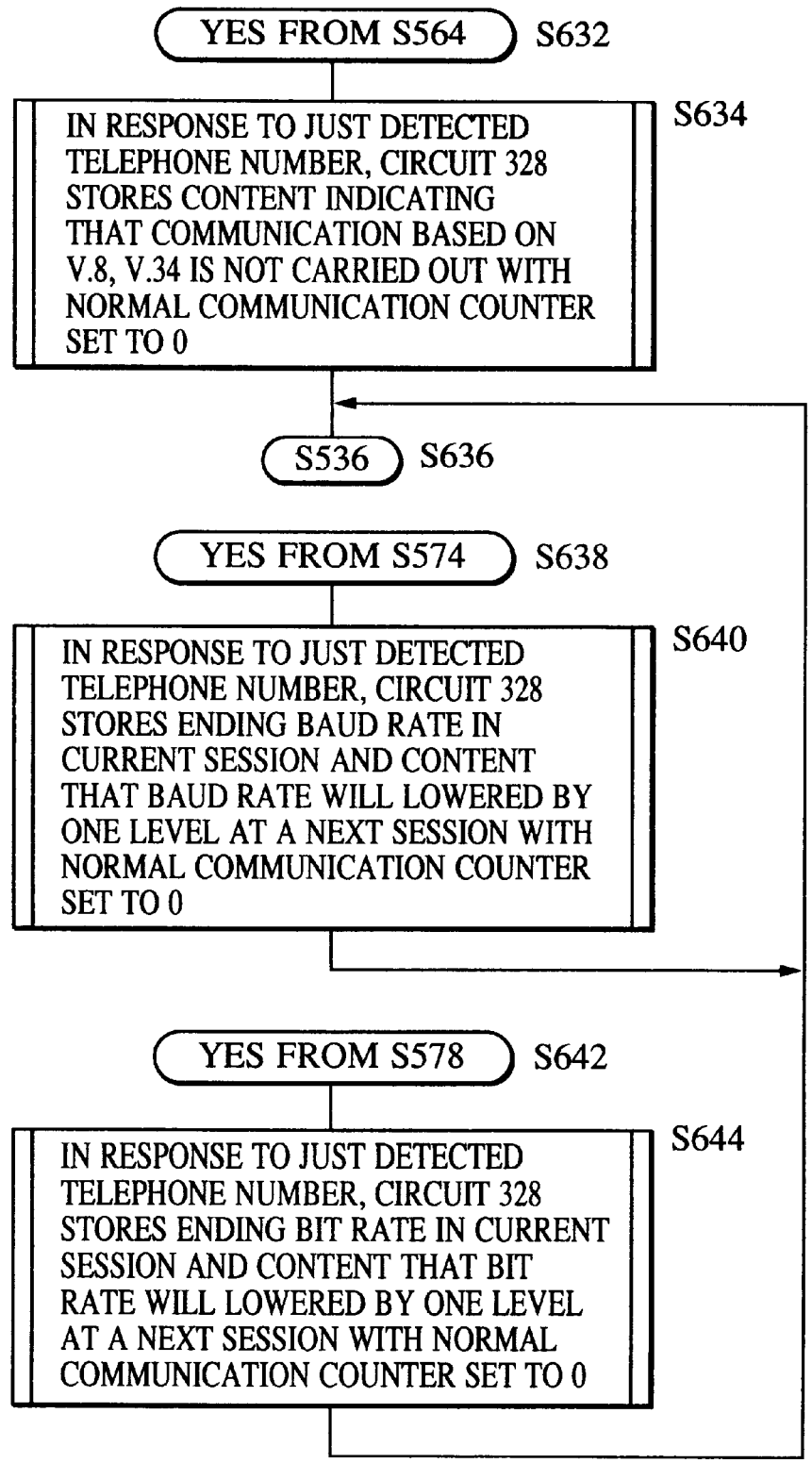
FIG. 28 is a flow diagram of the operation of the seventh embodiment.
Figure 29:
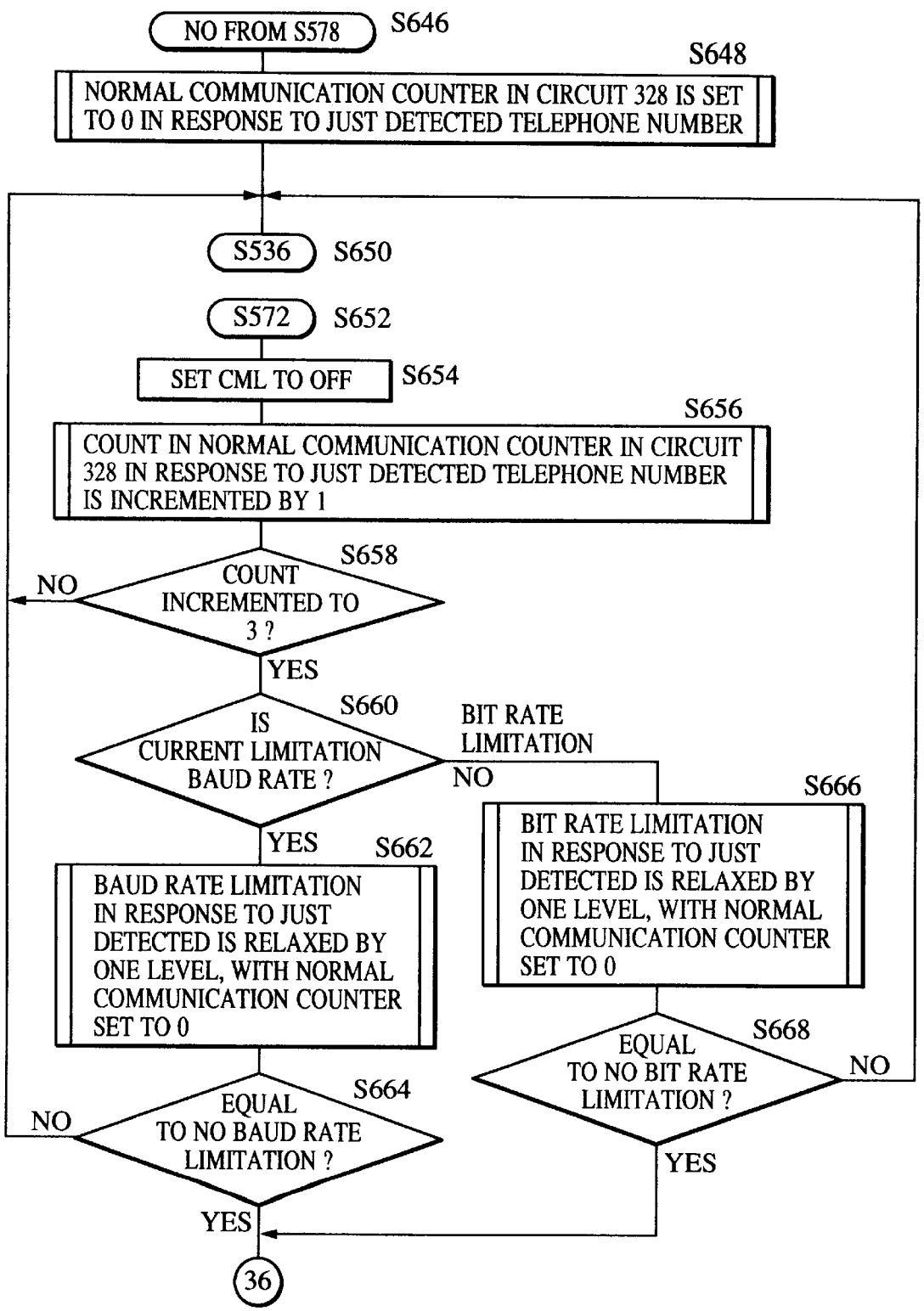
FIG. 29 is a flow diagram of the operation of the seventh embodiment.
Figure 30:
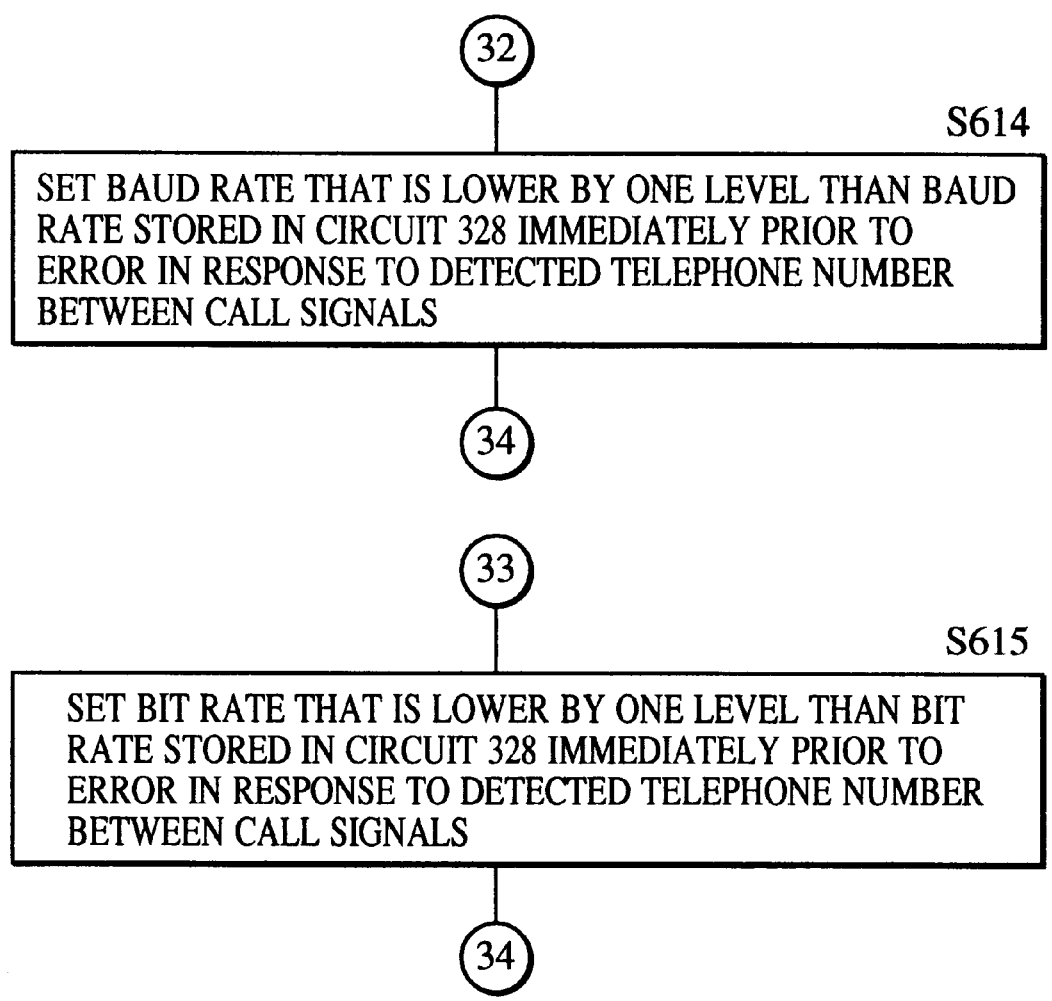
FIG. 30 is a flow diagram of the operation of the seventh embodiment.

Figure 28, "WILL LOWERED" (both occurrences) should read --WILL BE LOWERED--.

COLUMN 1

Line 14, "SEE" should read --*See*--.

COLUMN 4

Line 12, "communicateion" should read --communication--.
   Line 13, "a" should read --an--.

COLUMN 7

Line 40, "history is" should read --history, are--.

UNITED STATES PATENT AND TRADEMARK OFFICE
CERTIFICATE OF CORRECTION

PATENT NO. : 6,091,807
DATED : July 18, 2000
INVENTOR(S) : TAKEHIRO YOSHIDA

It is certified that error appears in the above-identified patent and that said Letters Patent is hereby corrected as shown below:

COLUMN 9

Line 62, "transmits" should be deleted.
    Line 67, "subsriber" should read --subscriber--.

COLUMN 13

Line 17, "A" should read --An--.
    Line 21, "a" should read --an--.

COLUMN 18

Line 12, "Whe" should read --When--.
    Line 23, "in" (second occurrence) should be deleted.
    Line 49, "according each" should read --according to each--.
    Line 55, "procedure," should read --procedures,--.
    Line 67, "six" should read --sixth--.

UNITED STATES PATENT AND TRADEMARK OFFICE
CERTIFICATE OF CORRECTION

PATENT NO. : 6,091,807
DATED : July 18, 2000
INVENTOR(S) : TAKEHIRO YOSHIDA

Page 4 of 4

It is certified that error appears in the above-identified patent and that said Letters Patent is hereby corrected as shown below:

COLUMN 21

Line 29, "(a" should read --(an--.
   Line 56, "other processed." should read --other
      processes.--.

COLUMN 22

Line 8, "step 724." should read --step S724--.

Signed and Sealed this

Twenty-fourth Day of April, 2001

Attest:

NICHOLAS P. GODICI

Attesting Officer    Acting Director of the United States Patent and Trademark Office